United States Patent
Hanada

(10) Patent No.: US 12,143,874 B2
(45) Date of Patent: Nov. 12, 2024

(54) CORE NETWORK APPARATUS, COMMUNICATION CONTROL METHOD, NON-TRANSITORY COMPUTER READABLE MEDIUM, AND RADIO COMMUNICATION SYSTEM

(71) Applicant: NEC Corporation, Tokyo (JP)

(72) Inventor: Toshitaka Hanada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 433 days.

(21) Appl. No.: 17/618,002

(22) PCT Filed: Mar. 3, 2020

(86) PCT No.: PCT/JP2020/008781
§ 371 (c)(1),
(2) Date: Dec. 10, 2021

(87) PCT Pub. No.: WO2020/255490
PCT Pub. Date: Dec. 24, 2020

(65) Prior Publication Data
US 2022/0256409 A1  Aug. 11, 2022

(30) Foreign Application Priority Data
Jun. 19, 2019  (JP) .................... 2019-113508

(51) Int. Cl.
*H04W 36/00* (2009.01)
*H04W 36/08* (2009.01)
*H04W 84/04* (2009.01)

(52) U.S. Cl.
CPC ... *H04W 36/0061* (2013.01); *H04W 36/0079* (2018.08); *H04W 36/08* (2013.01); *H04W 84/042* (2013.01)

(58) Field of Classification Search
CPC ......... H04W 36/0061; H04W 36/0079; H04W 36/08; H04W 84/042; H04W 12/08; H04W 76/12; H04W 88/14; H04W 88/18
See application file for complete search history.

(56) References Cited

U.S. PATENT DOCUMENTS

2014/0211728 A1*  7/2014  Zembutsu ............ H04W 36/12
                                                          370/329
2017/0078869 A1    3/2017  Dong
(Continued)

FOREIGN PATENT DOCUMENTS

JP  2009-253465 A  10/2009
JP  2017-513300 A   5/2017
(Continued)

OTHER PUBLICATIONS

International Search Report for PCT Application No. PCT/JP2020/008781, mailed on Jun. 16, 2020.

*Primary Examiner* — Mohammed S Chowdhury

(57) ABSTRACT

A core network apparatus in which a communication terminal is connected to an appropriate service network without depending on network identification information is provided. A core network apparatus includes: a reception unit configured to acquire, when a service network that provides a service for a communication terminal and the communication terminal are connected to each other, identification information of the communication terminal and identification information of a base station included in a connection request message transmitted from the base station connected to the communication terminal; a control unit configured to determine whether a first service associated with the identification information of the communication terminal coincides with a second service associated with the identification information of the base station; and a transmission unit configured to transmit connection information of a service (Continued)

network that provides the second service to the base station when the first service coincides with the second service.

10 Claims, 34 Drawing Sheets

(56) References Cited

U.S. PATENT DOCUMENTS

| | | | | |
|---|---|---|---|---|
| 2017/0325055 | A1* | 11/2017 | Enomoto | H04W 76/22 |
| 2019/0014504 | A1* | 1/2019 | Shimojou | H04W 24/02 |
| 2019/0053102 | A1 | 2/2019 | Oohira et al. | |
| 2019/0357295 | A1* | 11/2019 | Kim | H04W 76/25 |
| 2020/0236595 | A1* | 7/2020 | Cuevas Ramirez | H04W 36/22 |
| 2021/0298104 | A1 | 9/2021 | Akiyoshi | |
| 2021/0360564 | A1* | 11/2021 | Kawasaki | H04W 60/00 |
| 2022/0191766 | A1* | 6/2022 | Li | H04W 48/16 |
| 2022/0225459 | A1* | 7/2022 | Sama | H04W 76/18 |
| 2023/0007527 | A1* | 1/2023 | Baek | H04W 28/0268 |

FOREIGN PATENT DOCUMENTS

| | | |
|---|---|---|
| WO | 2013/047822 A1 | 4/2013 |
| WO | 2017/163735 A1 | 9/2017 |
| WO | 2018/062286 A1 | 4/2018 |

* cited by examiner

SERVICE MANAGEMENT TABLE T1

| PROVIDED SERVICE | PROVIDED AREA | | CONNECTION DESTINATION SGW IP ADDRESS | CONNECTION DESTINATION NW |
| --- | --- | --- | --- | --- |
| | eNB Name | eNB ID | | |
| SERVICE 1 | BASE STATION 1 | eNBID1 | SGW1 | CONNECTION DESTINATION NW1 |
| SERVICE 1 | BASE STATION 2 | eNBID2 | SGW1 | CONNECTION DESTINATION NW1 |
| SERVICE 2 | BASE STATION 1 | eNBID1 | SGW2 | CONNECTION DESTINATION NW2 |
| | | | | |
| SERVICE x | BASE STATION x | eNBIDx | SGWx | CONNECTION DESTINATION NWx |

Fig. 6

MOBILE EQUIPMENT MANAGEMENT TABLE T2

| USER | IMSI | S-TMSI | PROVIDED SERVICE |
|---|---|---|---|
| MOLE EQUIPMENT 1 | IMSI1 | STMSI1 | SERVICE 1 |
| MOLE EQUIPMENT 2 | IMSI2 | STMSI2 | SERVICE 2 |
|  |  |  |  |
|  |  |  |  |
| MOLE EQUIPMENT x | IMSIx | STMSIx | SERVICE x |

Fig. 7

Initial Attach PROCEDURE

SERVICE MANAGEMENT TABLE T1

| PROVIDED SERVICE | PROVIDED AREA | | CONNECTION DESTINATION SGW IP ADDRESS | CONNECTION DESTINATION NW |
|---|---|---|---|---|
| | eNB Name | eNB ID | | |
| SERVICE 1 | BASE STATION 1 | eNBID1 | SGW1 | CONNECTION DESTINATION NW1 |
| SERVICE 2 | BASE STATION 2 | eNBID2 | SGW2 | CONNECTION DESTINATION NW2 |
| SERVICE 3 | BASE STATION 3 | eNBID3 | SGW3 | CONNECTION DESTINATION NW3 |
| SERVICE 4 | BASE STATION 4 | eNBID4 | SGW4 | CONNECTION DESTINATION NW4 |

Fig. 21

MOBILE EQUIPMENT MANAGEMENT TABLE T2

| USER | IMSI | S-TMSI | PROVIDED SERVICE |
|---|---|---|---|
| MOLE EQUIPMENT 1 | IMSI1 | STMSI1 | SERVICE 1 |
| MOLE EQUIPMENT 2 | IMSI2 | STMSI2 | SERVICE 2 |
| MOLE EQUIPMENT 3 | IMSI3 | STMSI3 | SERVICE 3 |
| MOLE EQUIPMENT 4 | IMSI4 | STMSI4 | SERVICE 4 |

Fig. 22

SERVICE MANAGEMENT TABLE T1

| PROVIDED SERVICE | PROVIDED AREA | | CONNECTION DESTINATION SGW IP ADDRESS | CONNECTION DESTINATION NW |
| --- | --- | --- | --- | --- |
| | eNB Name | eNB ID | | |
| SERVICE 1 | BASE STATION 1 | eNBID1 | SGW1 | CONNECTION DESTINATION NW1 |
| SERVICE 1 | BASE STATION 2 | eNBID2 | SGW1 | CONNECTION DESTINATION NW1 |
| SERVICE 1 | BASE STATION 3 | eNBID3 | SGW1 | CONNECTION DESTINATION NW1 |
| SERVICE 1 | BASE STATION 4 | eNBID4 | SGW1 | CONNECTION DESTINATION NW1 |

Fig. 24

MOBILE EQUIPMENT MANAGEMENT TABLE T2

| USER | IMSI | S-TMSI | PROVIDED SERVICE |
|---|---|---|---|
| MOLE EQUIPMENT 1 | IMSI1 | STMSI1 | SERVICE 1 |
| MOLE EQUIPMENT 2 | IMSI2 | STMSI2 | SERVICE 1 |
| MOLE EQUIPMENT 3 | IMSI3 | STMSI3 | SERVICE 1 |
| MOLE EQUIPMENT 4 | IMSI4 | STMSI4 | SERVICE 1 |

Fig. 25

SERVICE MANAGEMENT TABLE T1

| PROVIDED SERVICE | PROVIDED AREA | | CONNECTION DESTINATION SGW IP ADDRESS | CONNECTION DESTINATION NW |
|---|---|---|---|---|
| | eNB Name | eNB ID | | |
| SERVICE 1 | BASE STATION 1 | eNBID1 | SGW1 | CONNECTION DESTINATION NW1 |
| SERVICE 2 | BASE STATION 1 | eNBID1 | SGW2 | CONNECTION DESTINATION NW2 |
| SERVICE 3 | BASE STATION 1 | eNBID1 | SGW3 | CONNECTION DESTINATION NW3 |
| SERVICE 4 | BASE STATION 1 | eNBID1 | SGW4 | CONNECTION DESTINATION NW4 |

Fig. 27

SERVICE MANAGEMENT TABLE T1

| PROVIDED SERVICE | PROVIDED AREA | | CONNECTION DESTINATION SGW IP ADDRESS | CONNECTION DESTINATION NW |
| --- | --- | --- | --- | --- |
| | eNB Name | eNB ID | | |
| SERVICE 1 | BASE STATION 1 | eNBID1 | SGW1 | CONNECTION DESTINATION NW1 |
| SERVICE 1 | BASE STATION 2 | eNBID2 | SGW1 | CONNECTION DESTINATION NW1 |
| SERVICE 2 | BASE STATION 1 | eNBID1 | SGW2 | CONNECTION DESTINATION NW2 |
| SERVICE 2 | BASE STATION 2 | eNBID2 | SGW2 | CONNECTION DESTINATION NW2 |

Fig. 29

MOBILE EQUIPMENT MANAGEMENT TABLE T2

| USER | IMSI | S-TMSI | PROVIDED SERVICE |
|---|---|---|---|
| MOLE EQUIPMENT 1 | IMSI1 | STMSI1 | SERVICE 1 |
| MOLE EQUIPMENT 2 | IMSI2 | STMSI2 | SERVICE 2 |
| MOLE EQUIPMENT 3 | IMSI3 | STMSI3 | SERVICE 1 |
| MOLE EQUIPMENT 4 | IMSI4 | STMSI4 | SERVICE 2 |

Fig. 30

SERVICE MANAGEMENT TABLE T1

| PROVIDED SERVICE | PROVIDED AREA | | CONNECTION DESTINATION SGW IP ADDRESS | CONNECTION DESTINATION NW |
|---|---|---|---|---|
| | eNB Name | eNB ID | | |
| SERVICE 1 | BASE STATION 1 | eNBID1 | SGW1 | CONNECTION DESTINATION NW1 |
| SERVICE 2 | BASE STATION 2 | eNBID2 | SGW2 | CONNECTION DESTINATION NW2 |

Fig. 32

MOBILE EQUIPMENT MANAGEMENT TABLE T2

| USER | IMSI | S-TMSI | PROVIDED SERVICE |
|---|---|---|---|
| MOLE EQUIPMENT 1 | IMSI1 | STMSI1 | SERVICE 1 |
| MOLE EQUIPMENT 2 | IMSI2 | STMSI2 | SERVICE 1 |
| MOLE EQUIPMENT 3 | IMSI3 | STMSI3 | SERVICE 2 |

Fig. 33

CORE NETWORK APPARATUS, COMMUNICATION CONTROL METHOD, NON-TRANSITORY COMPUTER READABLE MEDIUM, AND RADIO COMMUNICATION SYSTEM

This application is a National Stage Entry of PCT/JP2020/008781 filed on Mar. 3, 2020, which claims priority from Japanese Patent Application 2019-113508 filed on Jun. 19, 2019, the contents of all of which are incorporated herein by reference, in their entirety.

TECHNICAL FIELD

The present disclosure relates to a core network apparatus, a communication control method, and a communication control program.

BACKGROUND ART

In radio communication systems such as Long Term Evolution (LTE), a plurality of services are provided (e.g., Patent Literature 1). Patent Literature 1 discloses that a radio access apparatus provides a real-time game, an E-mail service and the like for radio communication terminals.

CITATION LIST

Patent Literature

[Patent Literature 1] International Patent Publication No. WO 2018/062286

SUMMARY OF INVENTION

Technical Problem

When a plurality of services are provided for customers in a radio communication system, it is possible to use different configuration values of a Public Land Mobile Network (PLMN) or an Access Point Name (APN) and distinguish service networks that correspond to provided services for each customer and each user from each other.

However, as the PLMN is information that is basically assigned for each communication carrier, the configuration value of the PLMN that one communication carrier can use is limited. Therefore, it is not practical to distinguish service networks for each customer and each user from each other by using different configuration values of PLMN.

When the service networks are distinguished from each other by using different configuration values of the APN, if the configuration value of the APN is changed on the user side, this user can connect to a service network of a service provided for another customer. In order to prevent the user from being able to connect to the service network of the service provided for the other customer, it may be possible to provide an authentication server for each APN so that only a user who has been successfully authenticated can connect to the service network of the service provided for him/her. In this case, however, a number of authentication servers which corresponds to the configuration value of the APN are required, which means that these authentication servers need to be provided (the number of authentication servers needs to be increased). Therefore, it is difficult to distinguish service networks from each other by using different configuration values of network identification information such as the PLMN or the APN for each service. That is, it is difficult to perform control so that the communication terminal is connected to an appropriate service network without depending on the network identification information.

One of the objects of the present disclosure is to provide, in view of the aforementioned problems, a core network apparatus, a communication control method, and a communication control program capable of allowing a communication terminal to be connected to an appropriate service network regardless of network identification information.

Solution to Problem

A core network apparatus according to the present disclosure includes:
  a reception unit configured to acquire, when a service network that provides a service for a communication terminal and the communication terminal are connected to each other, identification information of the communication terminal and identification information of a base station included in a connection request message transmitted from the base station connected to the communication terminal;
  a control unit configured to determine whether a first service associated with the identification information of the communication terminal coincides with a second service associated with the identification information of the base station; and
  a transmission unit configured to transmit connection information of a service network that provides the second service to the base station when the first service coincides with the second service.

A communication control method according to the present disclosure includes:
  acquiring, when a communication terminal is connected to a service network that provides a service for the communication terminal, identification information of the communication terminal and identification information of a base station included in a connection request message transmitted from the base station connected to the communication terminal;
  determining whether a first service associated with the identification information of the communication terminal coincides with a second service associated with the identification information of the base station; and
  transmitting connection information of a service network that provides the second service to the base station when the first service coincides with the second service.

A communication control program according to the present disclosure causes a computer to perform the following processing of:
  acquiring, when a communication terminal is connected to a service network that provides a service for the communication terminal, identification information of the communication terminal and identification information of a base station included in a connection request message transmitted from the base station connected to the communication terminal;
  determining whether a first service associated with the identification information of the communication terminal coincides with a second service associated with the identification information of the base station; and
  transmitting connection information of a service network that provides the second service to the base station when the first service coincides with the second service.

Advantageous Effects of Invention

According to the present disclosure, it is possible to provide a core network apparatus, a communication control method, and a communication control program capable of allowing a communication terminal to be connected to an appropriate service network regardless of network identification information.

BRIEF DESCRIPTION OF DRAWINGS

FIG. 6 is a diagram showing one example of a service management table;

FIG. 7 is a diagram showing one example of a mobile equipment management table;

FIG. 21 is a diagram showing a setting status of a service management table according to the operation example 1;

FIG. 22 is a diagram showing a setting status of a mobile equipment management table according to the operation example 1;

FIG. 24 is a diagram showing a setting status of a service management table according to the operation example 2;

FIG. 25 is a diagram showing a setting status of a mobile equipment management table according to the operation example 2;

FIG. 27 is a diagram showing a setting status of a service management table according to the operation example 3;

FIG. 29 is a diagram showing a setting status of a service management table according to the operation example 4;

FIG. 30 is a diagram showing a setting status of a mobile equipment management table according to the operation example 4;

FIG. 32 is a diagram showing a setting status of a service management table according to the operation example 5;

FIG. 33 is a diagram showing a setting status of a mobile equipment management table according to the operation example 5; and FIG. 34 is a diagram showing a hardware configuration example of a core network apparatus and the like.

DESCRIPTION OF EMBODIMENTS

Hereinafter, with reference to the drawings, example embodiments of the present disclosure will be described. For the sake of clarification of the description, the following description and the drawings are partially omitted and simplified as appropriate. Throughout the drawings, the same elements are denoted by the same symbols and overlapping descriptions are omitted as necessary.

First Example Embodiment

Figure 1:
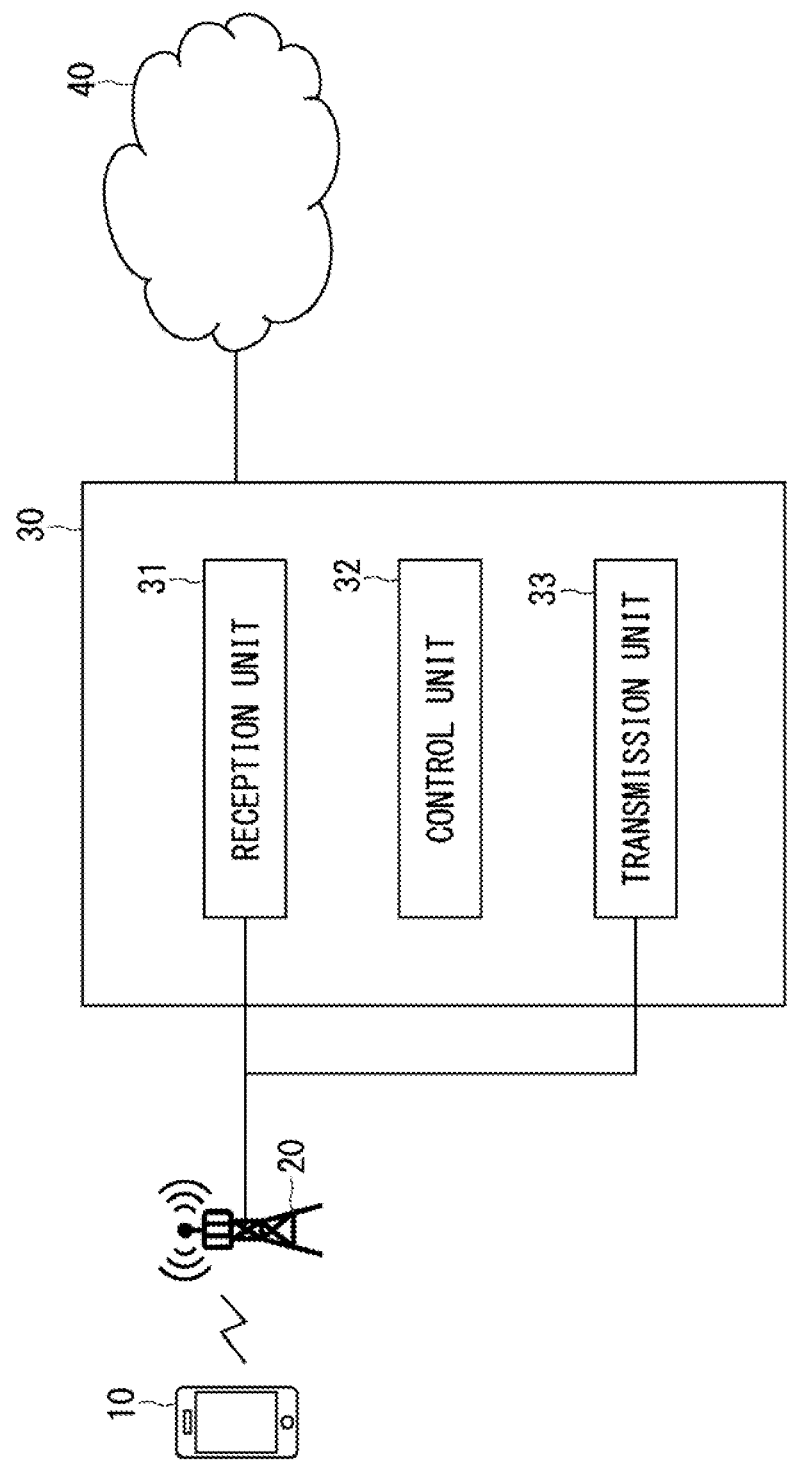
FIG. 1 is a diagram showing a configuration example of a radio communication system according to a first example embodiment.

With reference to FIG. 1, a radio communication system 1 according to a first example embodiment will be described. FIG. 1 is a diagram showing a configuration example of a radio communication system according to the first example embodiment. The radio communication system includes a communication terminal 10, a base station 20, a core network apparatus 30, and a service network 40.

The communication terminal 10 may be, for example, a mobile telephone terminal, a smartphone terminal, a tablet terminal, a mobile router, a personal computer device or the like. The communication terminal 10 communicates with the base station 20. The communication terminal 10 is connected to and communicates with the core network apparatus 30 via the base station 20. A service to be provided is set in the communication terminal 10 in advance, and the communication terminal 10 is configured to be able to connect to a service network of the service provided for the communication terminal 10 via the base station 20 and the core network apparatus 30.

The base station 20 is a communication apparatus arranged in a communication network. The base station 20 is connected to and communicates with the communication terminal 10 and is connected to and communicates with the core network apparatus 30. The base station 20 may be, for example, an evolved Node B (eNB) defined in the 3rd Generation Partnership Project (3GPP). A service whose provided area is a communication area of the base station 20 is set in the base station 20 in advance.

The core network apparatus 30 is a communication apparatus arranged in a communication network that is the same as the communication network in which the base station 20 is arranged. The core network apparatus 30 may be, for example, a Mobility Management Entity (MME) defined by the 3GPP. The core network apparatus 30 communicates with the communication terminal 10 via the base station 20 and controls communication between the communication terminal 10 and the service network 40.

The service network 40 is a network that provides a service for the communication terminal 10.

The core network apparatus 30 includes a reception unit 31, a control unit 32, and a transmission unit 33.

The reception unit 31 acquires, when the communication terminal 10 is connected to the service network 40, identification information of the communication terminal 10 and identification information of the base station 20 included in a connection request message transmitted from the base station 20 connected to the communication terminal 10.

The control unit 32 determines whether a first service associated with the identification information of the communication terminal 10 coincides with a second service associated with the identification information of the base station 20.

When the first service coincides with the second service, the transmission unit 33 transmits connection information of the service network 40 that provides the second service to the base station 20.

When the communication terminal 10 and the service network 40 are connected to each other, the core network apparatus 30 determines whether the first service provided for the communication terminal 10 coincides with the second service whose provided area is the communication area of the base station 20. When the first service coincides with the second service, the core network apparatus 30 transmits the connection information of the service network 40 to the base station 20. Accordingly, the base station 20 is able to allow the communication terminal 10 to be connected to the service network 40 that corresponds to a service provided for the communication terminal 10 using the connection information of the service network 40. Accordingly, with the core network apparatus 30 according to the first example embodiment, it becomes possible to allow a communication terminal to be connected to an appropriate service network regardless of network identification information.

Second Example Embodiment

Next, a second example embodiment will be described. The second example embodiment is an example embodiment in which the first example embodiment is specified in detail.

Figure 2:
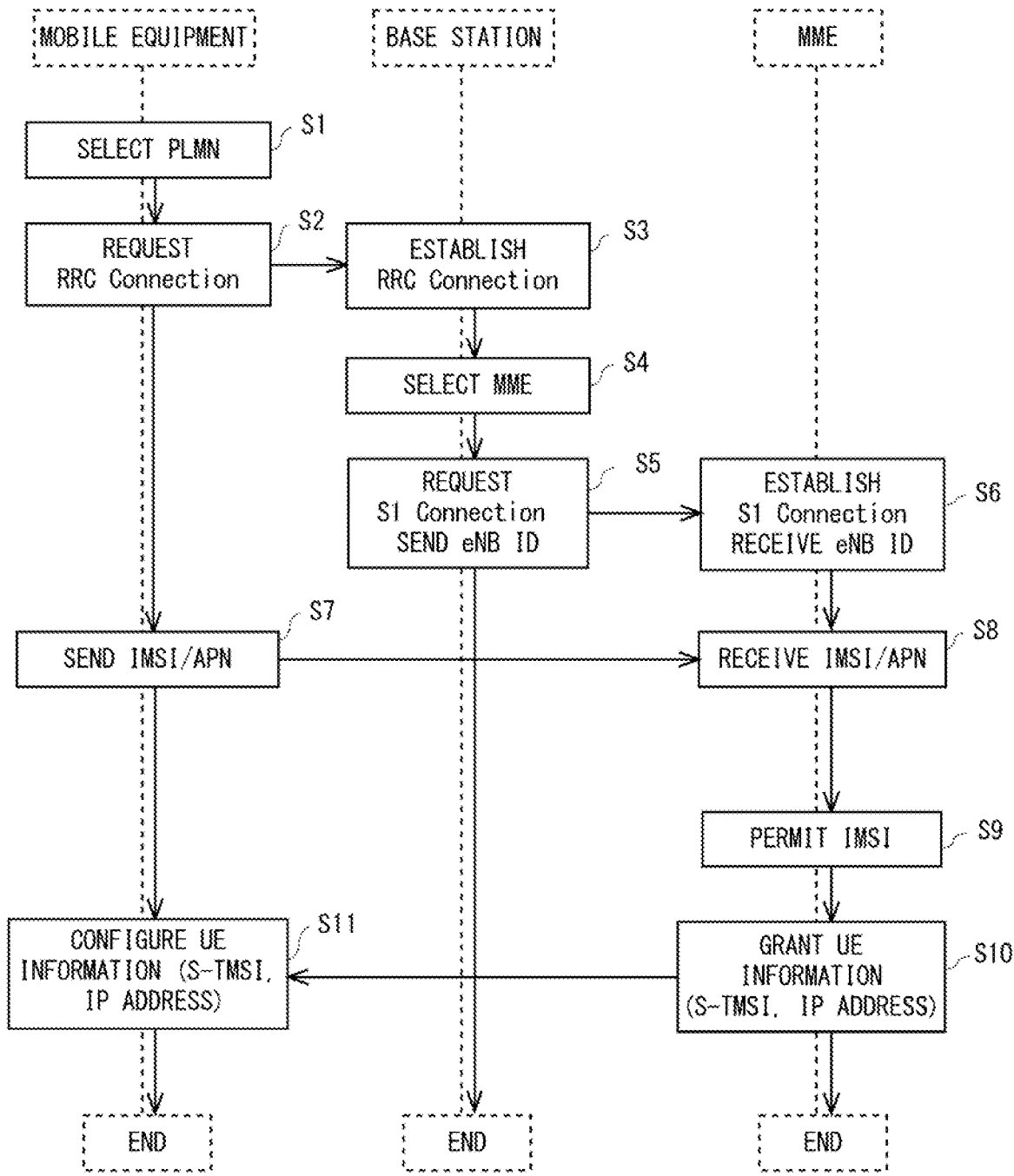
FIG. 2 is a diagram for describing issues to be addressed in a second example embodiment.
Figure 3:
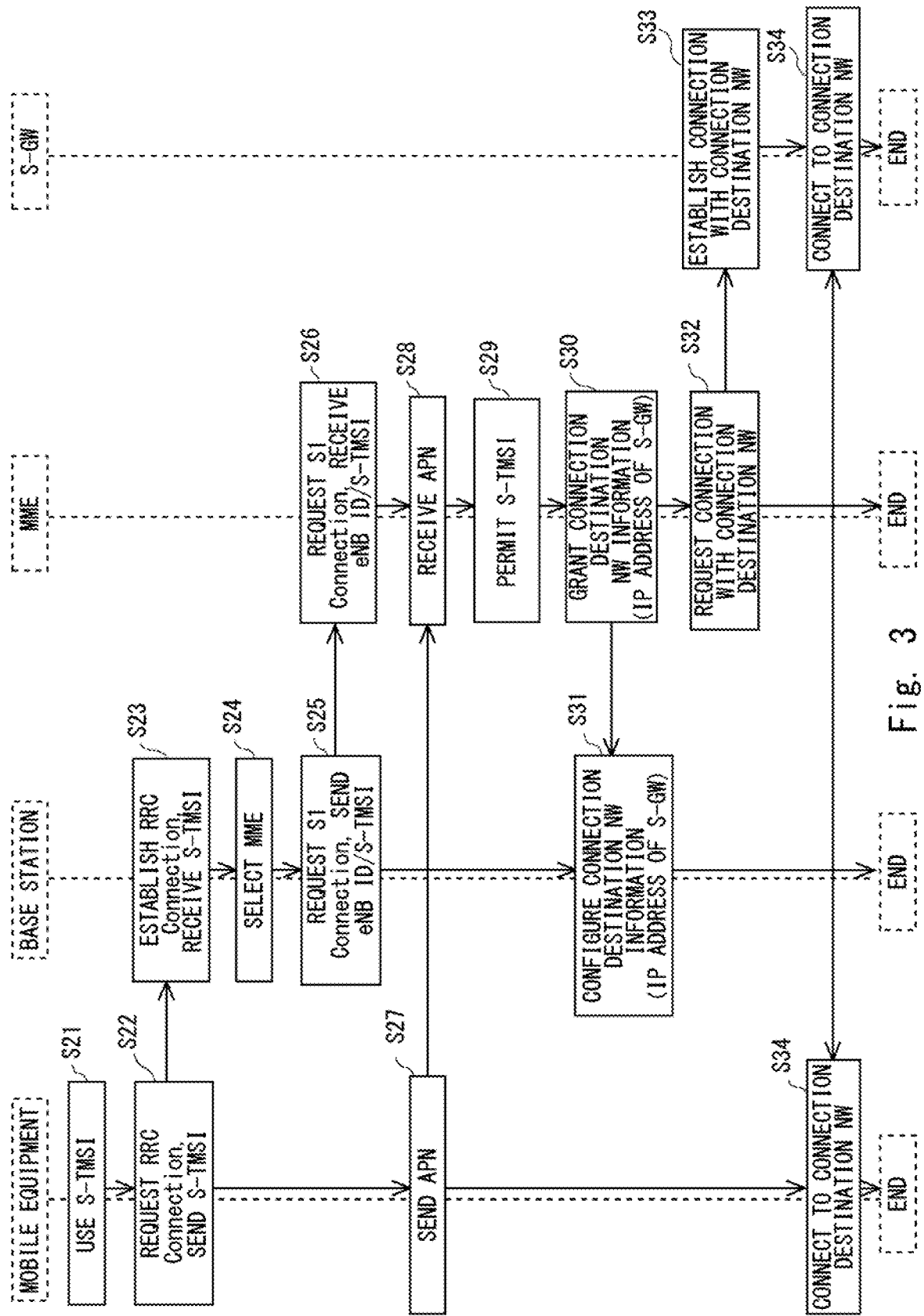
FIG. 3 is a diagram for describing issues to be addressed in the second example embodiment.

First, prior to giving the description of the details of the second example embodiment, issues to be addressed in the second example embodiment will be described. FIGS. 2 and 3 are diagrams for describing issues to be addressed in the second example embodiment. FIGS. 2 and 3 are procedures when mobile equipment, which is a communication terminal, is connected to a service network that provides a service to be provided for the mobile equipment. The procedure in which the mobile equipment is connected to the service network includes a procedure of Initial Attach in which the mobile equipment initially connects to a communication network and a procedure of call connection. In the following description, a mobile equipment may be referred to as User Equipment (UE) and a base station may be referred to as an eNB.

First, FIG. 2 will be described. FIG. 2 is a diagram showing a procedure when mobile equipment performs Initial Attach.

The mobile equipment selects a PLMN configured in itself (Step S1) and makes a Radio Resource Control (RRC) Connection request to the base station (Step S2).

The base station establishes RRC Connection with the mobile equipment (Step S3), selects the MME, which is a connection destination (Step S4), and makes an S1 Connection request (Step S5). The base station includes an eNB ID, which is its own identification information, in the S1 Connection request, and transmits the resulting S1 Connection request to the MME.

Upon receiving the S1 Connection request, the MME performs S1 Connection establishment (Step S6). The MME receives the eNB ID included in the S1 Connection request.

Once the S1 Connection is established, the mobile equipment sends an IMSI and an APN (Step S7) and the MME receives the IMSI and the APN transmitted from the mobile equipment (Step S8).

The MME permits the IMSI using the received IMSI and APN (Step S9), performs UE information granting, and transmits UE information to the mobile equipment (Step S10).

Specifically, the MME grants System Architecture Evolution (SAE)-Temporary Mobile Subscriber Identity (S-TMSI) and an IP address to the mobile equipment as UE information granting and transmits the S-TMSI and the IP address to the mobile equipment. In Step S10, the MME determines the IP address that is available in the service network and notifies the base station of the determined IP address.

The mobile equipment receives the S-TMSI and the IP address granted by the MME (Step S11). Then, the Initial Attach processing is ended.

Next, FIG. 3 will be described. FIG. 3 is a diagram showing a procedure when the call connection is performed by the mobile equipment. The mobile equipment uses the S-TMSI (Step S21) and makes an RRC Connection request to the base station (Step S21). The mobile equipment includes the S-TMSI that it uses in the RRC Connection request and transmits the resulting RRC Connection request to the base station.

Upon receiving the RRC Connection request, the base station establishes RRC Connection (Step S23) and selects the MME (Step S24). The base station includes the eNB ID and the S-TMSI in the S1 Connection request and transmits the resulting S1 Connection request to the MME (Step S25).

The MME receives the S1 Connection request, receives the eNB ID and the S-TMSI from the S1 Connection request, and establishes the S1 Connection (Step S26).

The mobile equipment notifies the MME of the APN (Step S27), the MME receives the APN (Step S28), and permits the S-TMSI using the S-TMSI and the APN that have been received (Step S29).

The MME grants connection destination NW information (Step S30) and transmits the IP address of the S-GW to the base station (Step S31). Specifically, in Step S30, the MME determines the IP address of the Serving Gateway (S-GW) in the service network to which the mobile equipment is connected.

The MME requests a connection with the service network (Step S32) and the S-GW establishes the connection with the service network (Step S33). The mobile equipment and the S-GW are connected to the service network (Step S34). Then, the call connection processing is ended.

One of the methods for using different service networks appropriately in the Initial Attach procedure in FIG. 2 is a method in which the MME performs the IMSI permission in Step S9 and the UE information granting in Step S10 in collaboration with an authentication server prepared for each APN. Alternatively, there is a method in which the MME performs the UE information granting in Step S10 for each APN after the MME has received the IMSI and the APN.

In the former case, since it is required to provide an authentication server for each APN, it is required to provide authentication servers whose number corresponds to the configuration value of the APN. That is, it becomes necessary to provide authentication servers whose number corresponds to the number of services to be provided. Further, in the latter case, if the configuration of the APN of the mobile equipment is changed, this mobile equipment can be connected to the service network that corresponds to the APN after the change. It may be possible to use different configuration values of PLMN in order to distinguish between service networks from each other. However, as the PLMN requires prior application and available configuration values are limited, it is not practical to use different service networks using the PLMN.

In order to solve the aforementioned problem, in this example embodiment, the PLMN and the APN are commonly used in the radio communication system and the procedure when the mobile equipment is connected to the service network is changed. The aim of this example embodiment is to enable a mobile equipment to be connected to an appropriate service network without depending on the network identification information such as the PLMN or the APN.

<Configuration Example of Radio Communication System>

Figure 4:
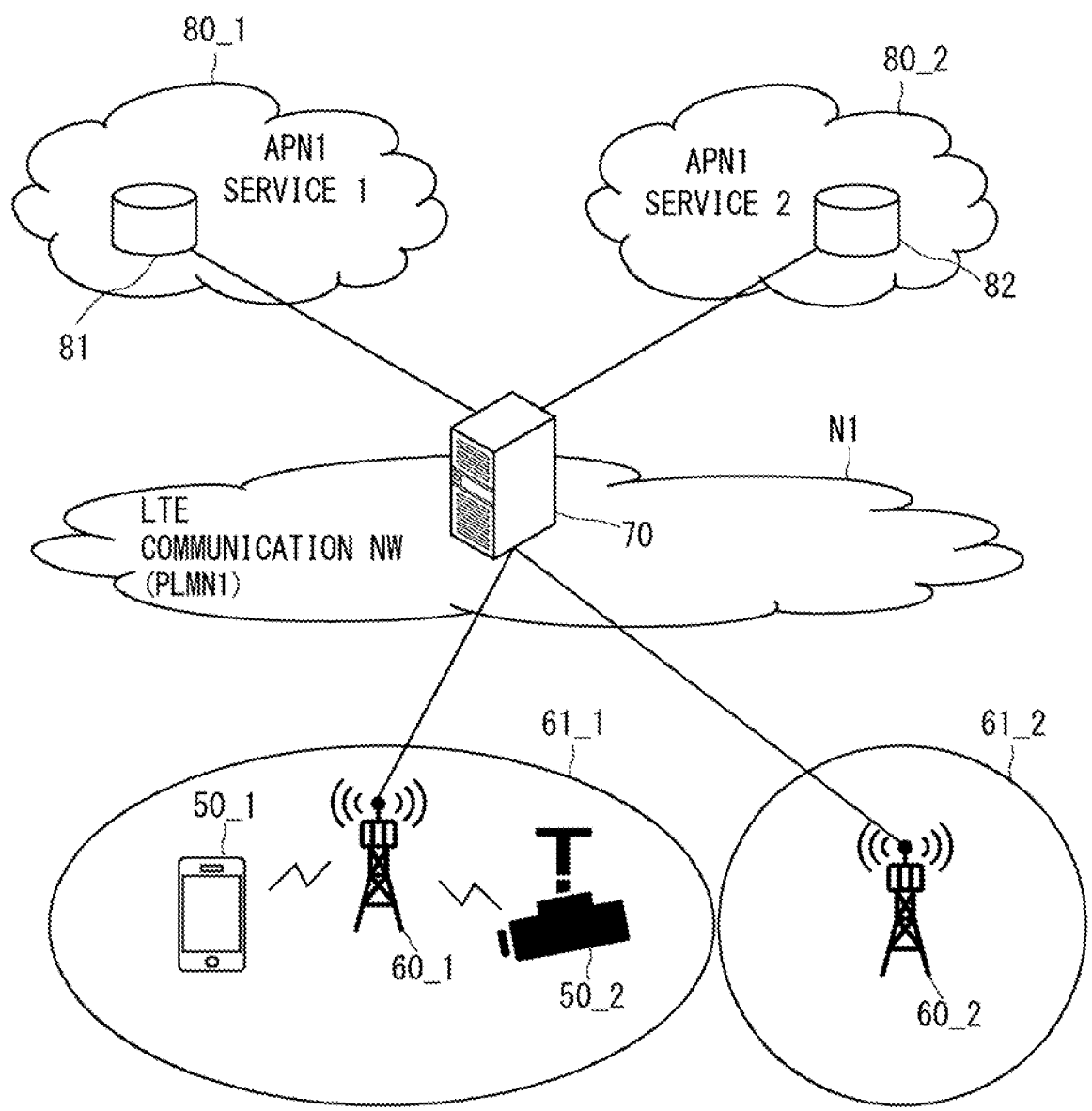
FIG. 4 is a diagram showing a configuration example of a radio communication system according to the second example embodiment.

With reference to FIG. 4, a configuration example of a radio communication system 100 according to the second example embodiment will be described. FIG. 4 is a diagram showing a configuration example of the radio communication system according to the second example embodiment. The radio communication system 100 includes mobile equipment 50_1 and 50_2, base stations 60_1 and 60_2, an MME 70, and service networks 80_1 and 80_2. The radio communication system 100 is a radio communication system that corresponds to LTE.

While the radio communication system 100 is described as a radio communication system that corresponds to LTE in this example embodiment, it may be a radio communication system that corresponds to LTE-Advanced. Further, while the radio communication system 100 is configured to include two mobile equipment, two base stations, and two service networks in FIG. 4, it may be configured to include one or more mobile equipment, one or more base station, and one or more service network. Further, while the radio communication system 100 is configured to include one MME in FIG. 4, the radio communication system 100 may include two or more MMEs.

The mobile equipment 50_1 and 50_2 may each be a mobile telephone terminal, a smartphone terminal, a tablet terminal, a mobile router, a personal computer device, an Internet Of Things (IoT) terminal or the like. The mobile equipment 50_1 and 50_2 may each be referred to as UE. The UE is a general term for communication terminals in the 3GPP. The mobile equipment 50_1 and 50_2 are mobile equipment that is present in a communication area 61_1 of the base station 60_1. The mobile equipment 50_1 and 50_2 can be connected to and communicate with the base station 60_1.

In this example embodiment, the mobile equipment 50_1, which is a movable communication terminal, is a communication terminal that can perform a handover from the base station 60_1 to the base station 60_2. Further, the mobile equipment 50_2 is, for example, an IoT terminal, a communication terminal that is arranged in a fixed position to some extent, and is a communication terminal capable of communicating with only the base station 60_1. That is, it is assumed that the mobile equipment 50_2 is a communication terminal that does not perform a handover from the base station 60_1 to the base station 60_2. It is assumed that the mobile equipment 50_1 is referred to as a mobile equipment 1 and the mobile equipment 50_2 is referred to as a mobile equipment 2.

The service provided for the mobile equipment 50_1 is a service 1, which is configured in the mobile equipment 50_1 in advance. The service provided for the mobile equipment 50_2 is a service 2, which is configured in the mobile equipment 50_2 in advance.

IMSI1, which is identification information for identifying the mobile equipment 50_1, is configured in the mobile equipment 50_1. IMSI2, which is identification information for identifying the mobile equipment 50_2, is configured in the mobile equipment 50_2. When the mobile equipment 50_1 is initially connected to the LTE communication network, S-TMSI, which is temporarily assigned identification information, is assigned to the mobile equipment 50_1, and the assigned S-TMSI is denoted by STMSI1. Further, when the mobile equipment 50_2 is initially connected to the LTE communication network, the S-TMSI, which is temporarily assigned identification information, is assigned to the mobile equipment 50_2, and the assigned S-TMSI is denoted by STMSI2.

The base stations 60_1 and 60_2 are base stations arranged in an LTE communication network N1. PLMN1 is configured in the LTE communication network N1. The base stations 60_1 and 60_2 may each be referred to as an eNB or an eNodeB. The eNB or the eNodeB is a base station of LTE defined in the 3GPP.

The eNB Name of the base station 60_1 is denoted by a base station 1 and the eNB Name of the base station 60_2 is denoted by a base station 2. Further, the eNB ID of the base station 60_1 is denoted by an eNB ID1 and the eNB ID of the base station 60_2 is denoted by an eNB ID2.

The base stations 60_1 and 60_2 respectively provide communication areas 61_1 and 61_2. Services whose provided areas are the communication areas 61_1 and 61_2 are set in the base stations 60_1 and 60_2, respectively. The base stations 60_1 and 60_2 are configured in such a way that they can be connected to and communicate with the mobile equipment 50_1 and 50_2, respectively, and can be connected to and communicate with the MME 70 as well.

The base station 60_1 communicates with the mobile equipment 50_1 and 50_2 and the MME 70 when the mobile equipment 50_1 and 50_2 are respectively connected to the service network that corresponds to the services provided for the mobile equipment 50_1 and 50_2. The base station 60_2 is a base station to which the mobile equipment 50_1 performs a handover when it performs a handover. When the mobile equipment 50_1 performs a handover from the base station 60_1 to the base station 60_2, the base station 60_1 serves as a source base station and the base station 60_2 serves as a target base station.

The MME 70 is a core network apparatus arranged in the LTE communication network N1. PLMN1 is configured in the LTE communication network N1. The MME 70 is a core network apparatus of LTE defined by the 3GPP.

When the mobile equipment 50_1 is connected to the service network that corresponds to the service provided for the mobile equipment 50_1, the MME 70 determines whether the service provided for the mobile equipment 50_1 coincides with the service provided by the base station 60_1.

When the service provided for the mobile equipment 50_1 coincides with the service provided by the base station 60_1, the MME 70 enables the mobile equipment 50_1 to be connected to the service network that corresponds to the service provided for the mobile equipment 50_1.

When the mobile equipment 50_2 is connected to the service network that corresponds to the service provided for the mobile equipment 50_2, the MME 70 determines whether the service provided for the mobile equipment 50_2 coincides with the service provided by the base station 60_1. When the service provided for the mobile equipment 50_2 coincides with the service provided by the base station 60_1, the MME 70 enables the mobile equipment 50_2 to be connected to the service network that corresponds to the service provided for the mobile equipment 50_2.

The service network 80_1 is a network that provides the service 1. The service network 80_1 includes an S-GW 81. The service network 80_2 is a network that provides the service 2. The service network 80_2 includes an S-GW 82.

The service networks 80_1 and 80_2 are configured with one APN, that is, APN1. That is, the service networks 80_1 and 80_2 are assigned with APN, which is common network identification information. The service networks 80_1 and 80_2 may each be referred to as a Packet Data Network (PDN).

In the following description, the service network may be denoted by a connection destination NW, the service network 80_1 may be denoted by a connection destination NW1, and the service network 80_2 may be denoted by a connection destination NW2. Further, the IP address of the S-GW 81 is denoted by an SGW1 and the IP address of the S-GW 82 is denoted by an SGW2. In the following description, the S-GW may be simply referred to as an SGW.

To sum up, the customer service is a service that is provided via an LTE communication network, the service provided for the mobile equipment 50_1 is the service 1, and the service provided for the mobile equipment 50_2 is the service 2. The mobile equipment 50_1 is connected to the service network 80_1 in the communication area 61_1 of the base station 60_1, whereby the service 1 is provided. Further, the mobile equipment 50_2 is connected to the service network 80_2 in the communication area 61_1 of the base station 60_1, whereby the service 2 is provided.

<Configuration Example of MME>

Figure 5:
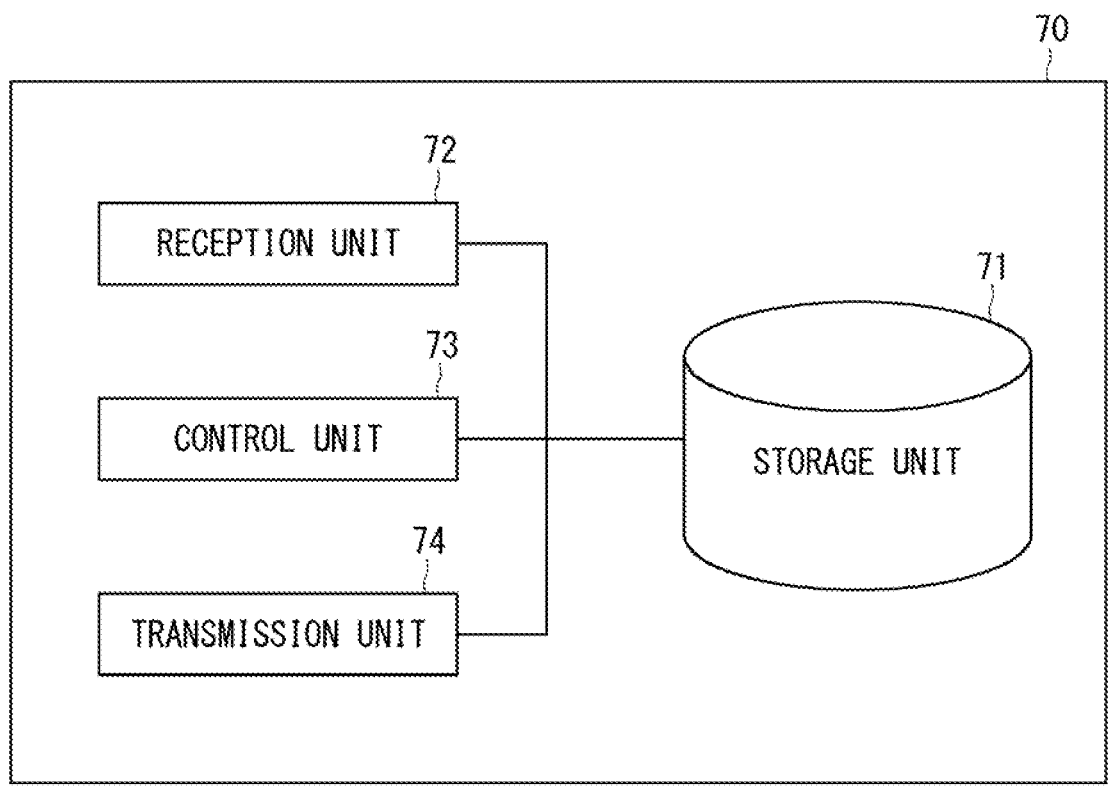
FIG. 5 is a diagram showing a configuration example of an MME according to the second example embodiment.

Referring next to FIG. 5, a configuration example of the MME 70 according to the second example embodiment will be described. FIG. 5 is a diagram showing a configuration example of the MME according to the second example embodiment. The MME 70 includes a storage unit 71, a reception unit 72, a control unit 73, and a transmission unit 74.

The storage unit 71 stores two management tables including a service management table T1 and a mobile equipment management table T2. Referring now to FIGS. 6 and 7, the service management table T1 and the mobile equipment management table T2 will be described. FIG. 6 is a diagram showing one example of the service management table. FIG. 7 is a diagram showing one example of the mobile equipment management table.

First, the service management table T1 will be described. The service management table T1 is a table that manages a base station list (eNB ID) and the service network for each customer service. The service management table T1, which is a table that is managed for each table, in which the area for which the service is provided, a connection destination SGW IP address, and a connection destination NW are associated with one another for each service.

The information configured in the service management table T1 is set in advance by an administrator, a carrier, an operator or the like who manages the radio communication system 100. The service management table T1 is updated when, for example, a new service is provided in a new base station in a case in which a new service is added.

The provided service, the provided area, the connection destination SGW IP address, and the connection destination NW are configured in the service management table T1 in this order from the left to the right.

The services provided by the radio communication system 100 are configured in the provided service. In one example shown in FIG. 6, the radio communication system 100 provides services 1 to x, which are configured in the column of the provided service.

Information indicating for which communication area of which base station each service set in the provided service is provided is configured in the provided area. The eNB Name and the eNB ID, which are the identification information of the base station, are configured in the provided area. One example shown in FIG. 6 shows that the provided area of the service 1 is the communication area 61_1 of the base station 60_1 whose eNB Name is the base station 1 and eNB ID is the eNB ID1. Further, the provided area of the service 2 is the communication area 61_1 of the base station 60_1 whose eNB Name is the base station 1 and eNB ID is the eNB ID1. Note that a plurality of base stations may be registered for one provided service and one example shown in FIG. 6 shows that the base station 2 is registered as well for the service 1.

The IP address of the S-GW included in the service network that corresponds to the provided service is configured in the connection destination SGW IP address. In one example shown in FIG. 6, the S-GW 81 is included in the service network that corresponds to the service 1, and the SGW1, which is the IP address of the S-GW 81, is configured therein. Further, the S-GW 82 is included in the service network that corresponds to the service 2, and the SGW2, which is an IP address of the S-GW 82, is configured therein.

The service network that corresponds to the provided service is configured in the connection destination NW. In one example shown in FIG. 6, the service network that corresponds to the service 1 is the service network 80_1, and the connection destination NW1 is configured in accordance with the service 1. Further, the service network that corresponds to the service 2 is the service network 80_2, and the connection destination NW2 is configured in accordance with the service 2.

Next, the mobile equipment management table T2 will be described. The mobile equipment management table T2 is a table that manages, for each user, the identification information of the mobile equipment and the provided service. User, IMSI, S-TMSI, and provided service are configured in the mobile equipment management table T2. User, IMSI, and provided service configured in the mobile equipment management table T2 are configured by a carrier, an operator or the like who manages the radio communication system 100 in advance. The mobile equipment management table T2 is updated when the S-TMSI is configured for the mobile equipment configured as a user.

The mobile equipment that the user holds is configured in user. One example shown in FIG. 7 shows that mobile equipment 1 to mobile equipment x are registered.

The IMSI, which is the identification information configured in the mobile equipment configured in the column of the user, is configured in IMSI. In one example shown in FIG. 7, the IMSI of the mobile equipment 50_1, which is the mobile equipment 1, is IMSI1, which is configured in association with the mobile equipment 1. The IMSI of the mobile equipment 50_2, which is the mobile equipment 2, is IMSI2, which is configured in association with the mobile equipment 2.

The S-TMSI, which is temporarily assigned identification information that is assigned when the mobile equipment configured in the column of the user is initially connected to the LTE communication network and is identification information of the mobile equipment, is configured in S-TMSI. In one example shown in FIG. 7, the S-TMSI of the mobile equipment 1 is STMSI1, which is configured in accordance with the mobile equipment 1. The S-TMSI of the mobile equipment 2 is STMSI2, which is configured in accordance with the mobile equipment 2.

Services provided for the mobile equipment configured in the column of the user is configured in provided service. In one example shown in FIG. 7, the provided service for the mobile equipment 50_1, which is the mobile equipment 1, is the service 1, which is configured in association with the mobile equipment 1. The provided service for the mobile equipment 50_2, which is the mobile equipment 2, is the service 2, which is configured in association with the mobile equipment 2.

Referring once again to FIG. 5, a configuration of the reception unit 72 will be described.

The reception unit 72 acquires, when the mobile equipment 50_1 is connected to the service network 80_1, the identification information of the mobile equipment 50_1 and the identification information of the base station 60_1 included in the connection request message transmitted from the base station 60_1 connected to the mobile equipment 50_1.

The reception unit 72 acquires, when the mobile equipment 50_2 is connected to the service network 80_2, the identification information of the mobile equipment 50_1 and the identification information of the base station 60_1 included in the connection request message transmitted from the base station 60_1 connected to the mobile equipment 50_2.

The procedure when the mobile equipment 50_1 is connected to the service network 80_1 includes the Initial Attach procedure performed at the time of initial connection and the call connection procedure, and the connection request message is an INITIAL UE MESSAGE message. When the Initial Attach is performed, the reception unit 72 acquires the IMSI of the mobile equipment 50_1 and the eNB ID of the base station 60_1 included in the INITIAL UE MESSAGE message. When the call connection is performed, the reception unit 72 acquires the S-TMSI of the mobile equipment 50_1 and the eNB ID of the base station 60_1 included in the INITIAL UE MESSAGE message.

When the Initial Attach is performed, the reception unit 72 acquires the IMSI of the mobile equipment 50_2 and the eNB ID of the base station 60_1 included in the INITIAL UE MESSAGE message. When the call connection is performed, the reception unit 72 acquires the S-TMSI of the mobile equipment 50_2 and the eNB ID of the base station 60_1 included in the INITIAL UE MESSAGE message.

Further, when the mobile equipment 50_1 performs a handover from the base station 60_1 to the base station 60_2, the reception unit 72 acquires the identification information of the base station 60_2 included in a handover request message transmitted from the base station 60_1 or the base station 60_2. The case in which the mobile equipment 50_1 performs a handover from the base station 60_1 to the base station 60_2 includes a case in which the handover is performed by an S1-Handover procedure and a case in which the handover is performed by an X2-Handover procedure.

When the mobile equipment 50_1 performs a handover from the base station 60_1 to the base station 60_2 by the S1-Handover procedure, the reception unit 72 acquires the eNB ID of the base station 60_2 from a HANDOVER REQUIRED message transmitted from the base station 60_1.

When the mobile equipment 50_1 performs a handover from the base station 60_1 to the base station 60_2 by the X2-Handover procedure, the reception unit 72 acquires the eNB ID of the base station 60_2 from a PATH SWITCH REQUEST message transmitted from the base station 60_2.

When the mobile equipment 50_1 performs Attach and Tracking Area (TA) Update in which it is not connected to the service network 80_1, the reception unit 72 acquires the S-TMSI of the mobile equipment 50_1 from the INITIAL UE MESSAGE message.

When the mobile equipment 50_2 performs Attach and TA Update in which it is not connected to the service network 80_2, the reception unit 72 acquires the S-TMSI of the mobile equipment 50_2 from the INITIAL UE MESSAGE message.

When the mobile equipment 50_1 and the service network 80_1 are connected to each other, the control unit 73 determines whether the service associated with the identification information of the mobile equipment 50_1 coincides with the service associated with the identification information of the base station 60_1.

When the mobile equipment 50_2 and the service network 80_2 are connected to each other, the control unit 73 determines whether the service associated with the identification information of the mobile equipment 50_2 coincides with the service associated with the identification information of the base station 60_1.

The control unit 73 specifies the service associated with the mobile equipment 50_1, the service associated with the mobile equipment 50_2, and the service associated with the base station 60_1 based on the service management table T1 and the mobile equipment management table T2.

When the service associated with the mobile equipment 50_1 coincides with the service associated with the base station 60_1, the control unit 73 permits connection between the mobile equipment 50_1 and the service network 80_1.

When the service associated with the mobile equipment 50_2 coincides with the service associated with the base station 60_1, the control unit 73 permits connection between the mobile equipment 50_2 and the service network 80_2.

When the Initial Attach is performed, the control unit 73 performs the aforementioned control based on the IMSI of the mobile equipment 50_1 and 50_2 and the eNB ID of the base station 60_1.

When the call connection is performed, the control unit 73 performs the aforementioned control based on the S-TMSI of the mobile equipment 50_1 and 50_2 and the eNB ID of the base station 60_1.

In one example shown in FIGS. 6 and 7, the services associated with the base station 60_1 are the services 1 and 2, and the service associated with the mobile equipment 50_1 is the service 1. The service associated with the mobile equipment 50_1 coincides with the service associated with the base station 60_1. Therefore, the control unit 73 permits the connection between the mobile equipment 50_1 and the service network 80_1.

Further, the services associated with the base station 60_1 are the services 1 and 2, the service associated with the mobile equipment 50_2 is the service 2, and the service associated with the mobile equipment 50_2 coincides with the service associated with the base station 60_1. Therefore, the control unit 73 permits the connection between the mobile equipment 50_2 and the service network 80_2.

On the other hand, the control unit 73 rejects the connection when the service associated with the mobile equipment 50_1 does not coincide with the service associated with the base station 60_1 when the Initial Attach and/or the call connection is performed.

Likewise, the control unit 73 rejects the connection when the service associated with the mobile equipment 50_2 does not coincide with the service associated with the base station 60_1 when the Initial Attach and/or the call connection is performed.

When the connection of the mobile equipment 50_1 is permitted at the time in which the Initial Attach is performed, the control unit 73 acquires the connection destination NW associated with the service that corresponds to the mobile equipment 50_1 and the base station 60_1 from the service management table T1. The control unit 73 acquires the address information that is available in the service network that corresponds to the connection destination NW as the connection information of the service network 80_1. Specifically, the control unit 73 determines the IP address that is available in the service network that corresponds to the connection destination NW and acquires the determined IP address as the connection information of the service network 80_1.

When the connection of the mobile equipment 50_2 is permitted at the time in which the Initial Attach is performed, the control unit 73 acquires the connection destination NW associated with the service that corresponds to the mobile equipment 50_2 and the base station 60_1 from the service management table T1. The control unit 73 acquires the address information that is available in the service network that corresponds to the connection destination NW as the connection information of the service network 80_2. Specifically, the control unit 73 determines the IP address that is available in the service network that corresponds to the connection destination NW and acquires the determined IP address as the connection information of the service network 80_2.

When the connection of the mobile equipment 50_1 is permitted at the time in which the call connection is performed, the control unit 73 acquires the address information of the S-GW 81 associated with the service that corresponds to the mobile equipment 50_1 and the base station 60_1 from the service management table T1 as the connection information of the service network 80_1. Specifically, the control unit 73 acquires the connection destination SGW IP address associated with the service that corresponds to the mobile equipment 50_1 and the base station 60_1 from the service management table T1 as the address information of the S-GW 81.

When the connection of the mobile equipment 50_2 is permitted at the time in which the call connection is performed, the control unit 73 acquires the address information of the S-GW 82 associated with the service that corresponds to the mobile equipment 50_2 and the base station 60_1 from the service management table T1 as the connection information of the service network 80_2. Specifically, the control unit 73 acquires the connection destination SGW IP address associated with the service that corresponds to the mobile equipment 50_2 and the base station 60_1 from the service management table T1 as the address information of the S-GW 82.

When the mobile equipment 50_1 performs a handover from the base station 60_1 to the base station 60_2, the control unit 73 determines whether the service associated with the identification information of the base station 60_2 coincides with the service associated with the identification information of the base station 60_1.

The control unit 73 specifies the service associated with the eNB ID of the base station 60_1 and the service associated with the eNB ID of the base station 60_2 based on the service management table T1. Then, when the service associated with the eNB ID of the base station 60_1 coincides with the service associated with the eNB ID of the base station 60_2, the control unit 73 permits a handover.

When the control unit 73 permits a handover, the control unit 73 acquires the IP address of the S-GW 81 associated with the service that corresponds to the base stations 60_1 and 60_2 from the service management table T1 as the connection information of the service network 80_1. Specifically, the control unit 73 acquires the connection destination SGW IP address associated with the service that corresponds to the base stations 60_1 and 60_2 from the service management table T1 as the connection information of the service network 80_1.

On the other hand, when the service associated with the eNB ID of the base station 60_1 does not coincide with the service associated with the eNB ID of the base station 60_2, the control unit 73 rejects a handover.

When the mobile equipment 50_1 performs Attach and TA Update in which it is not connected to the service network 80_1, the control unit 73 determines whether the S-TMSI of the mobile equipment 50_1 is registered in the mobile equipment management table T2.

When the S-TMSI of the mobile equipment 50_1 is registered in the mobile equipment management table T2, the control unit 73 continues the Attach processing and the TA Update processing. On the other hand, when the S-TMSI of the mobile equipment 50_1 is not registered in the mobile equipment management table T2, the control unit 73 rejects the Attach processing and the TA Update processing.

When the mobile equipment 50_2 performs Attach and TA Update in which it is not connected to the service network 80_2, the control unit 73 determines whether the S-TMSI of the mobile equipment 50_2 is registered in the mobile equipment management table T2.

When the S-TMSI of the mobile equipment 50_2 is registered in the mobile equipment management table T2, the control unit 73 continues the Attach processing and the TA Update processing. On the other hand, when the S-TMSI of the mobile equipment 50_2 is not registered in the mobile equipment management table T2, the control unit 73 rejects the Attach processing and the TA Update processing.

When the mobile equipment 50_1 is connected to the service network 80_1 and the service associated with the mobile equipment 50_1 coincides with the service associated with the base station 60_1, the transmission unit 74 transmits the connection information of the service network 80_1 to the base station 60_1.

Specifically, when the Initial Attach is performed, the transmission unit 74 transmits the IP address that is available in the service network 80_1 to the base station 60_1. Further, when the call connection is performed, the transmission unit 74 transmits the IP address of the S-GW included in the service network 80_1 to the base station 60_1.

When the mobile equipment 50_2 is connected to the service network 80_2 and the service associated with the mobile equipment 50_2 coincides with the service associated with the base station 60_1, the transmission unit 74 transmits the connection information of the service network 80_2 to the base station 60_1.

Specifically, when the Initial Attach is performed, the transmission unit 74 transmits the IP address that is available in the service network 80_2 to the base station 60_1. Further, when the call connection is performed, the transmission unit 74 transmits the IP address of the S-GW included in the service network 80_2 to the base station 60_1.

According to the above operations, the mobile equipment 50_1, the base station 60_1, and the service network 80_1 are connected to one another and the mobile equipment 50_2, the base station 60_1, and the service network 80_2 are connected to one another.

When the mobile equipment 50_1 performs a handover from the base station 60_1 to the base station 60_2 and the handover is permitted, the transmission unit 74 transmits the connection information of the service network 80_1 to the base station 60_2.

Specifically, when the mobile equipment 50_1 performs a handover from the base station 60_1 to the base station 60_2 and the handover is permitted, the transmission unit 74 transmits the IP address of the S-GW that corresponds to the service network 80_1 to the base station 60_2. Accordingly, the mobile equipment 50_1, the base station 60_2, and the service network 80_1 are connected to one another.

When the mobile equipment 50_1 and 50_2 are rejected to connect to the service networks 80_1 and 80_2, respectively, the transmission unit 74 may transmit a message indicating that the connection has been rejected to the base station 60_1. Further, when the mobile equipment 50_1 is rejected to perform a handover from the base station 60_1 to the base station 60_2, the transmission unit 74 may transmit a message indicating that the handover has been rejected to the base station 60_1 or the base station 60_2.

<Operation Examples of Radio Communication System>

Figure 8:
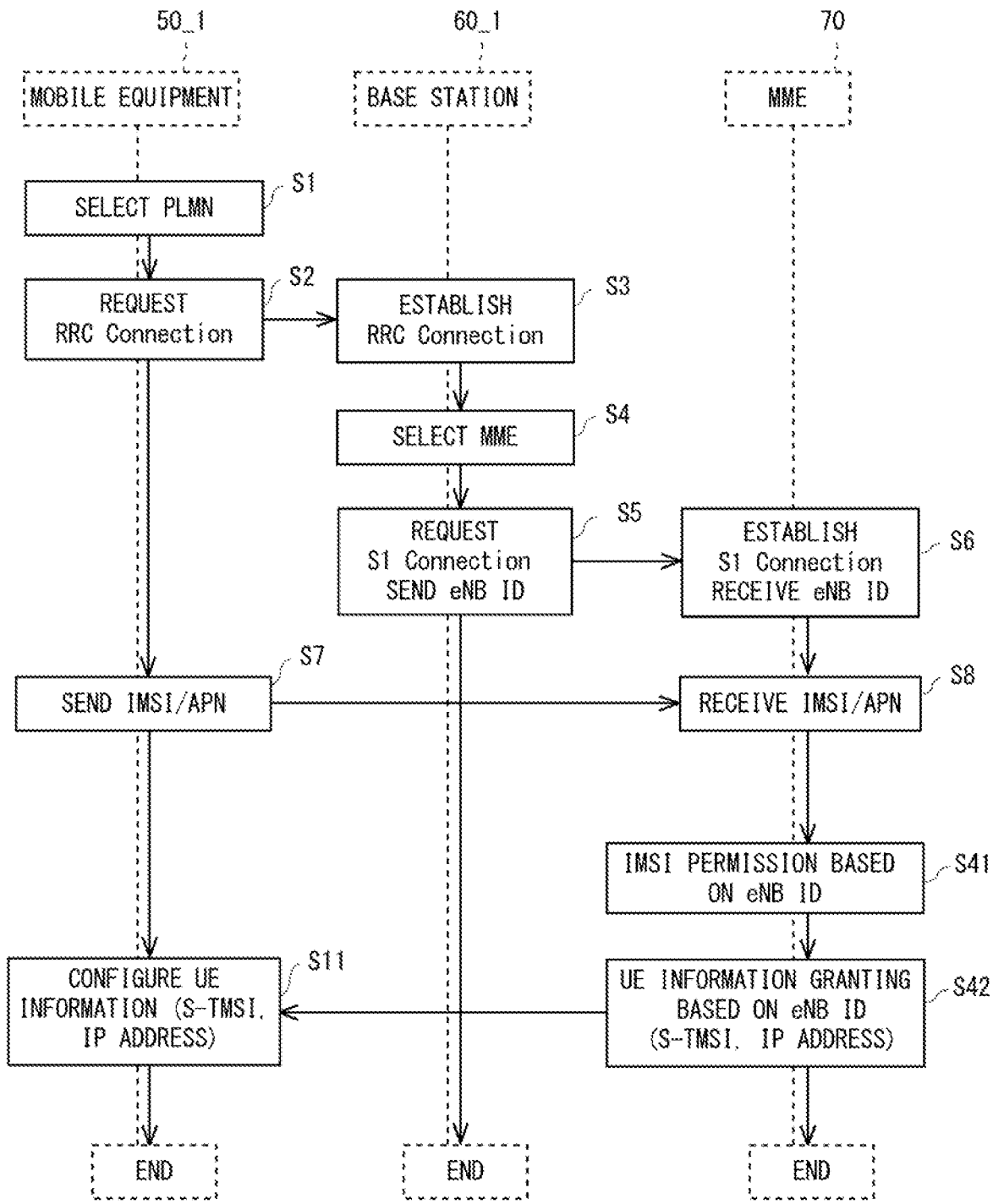
FIG. 8 is a diagram showing an operation example of the radio communication system according to the second example embodiment.
Figure 9:
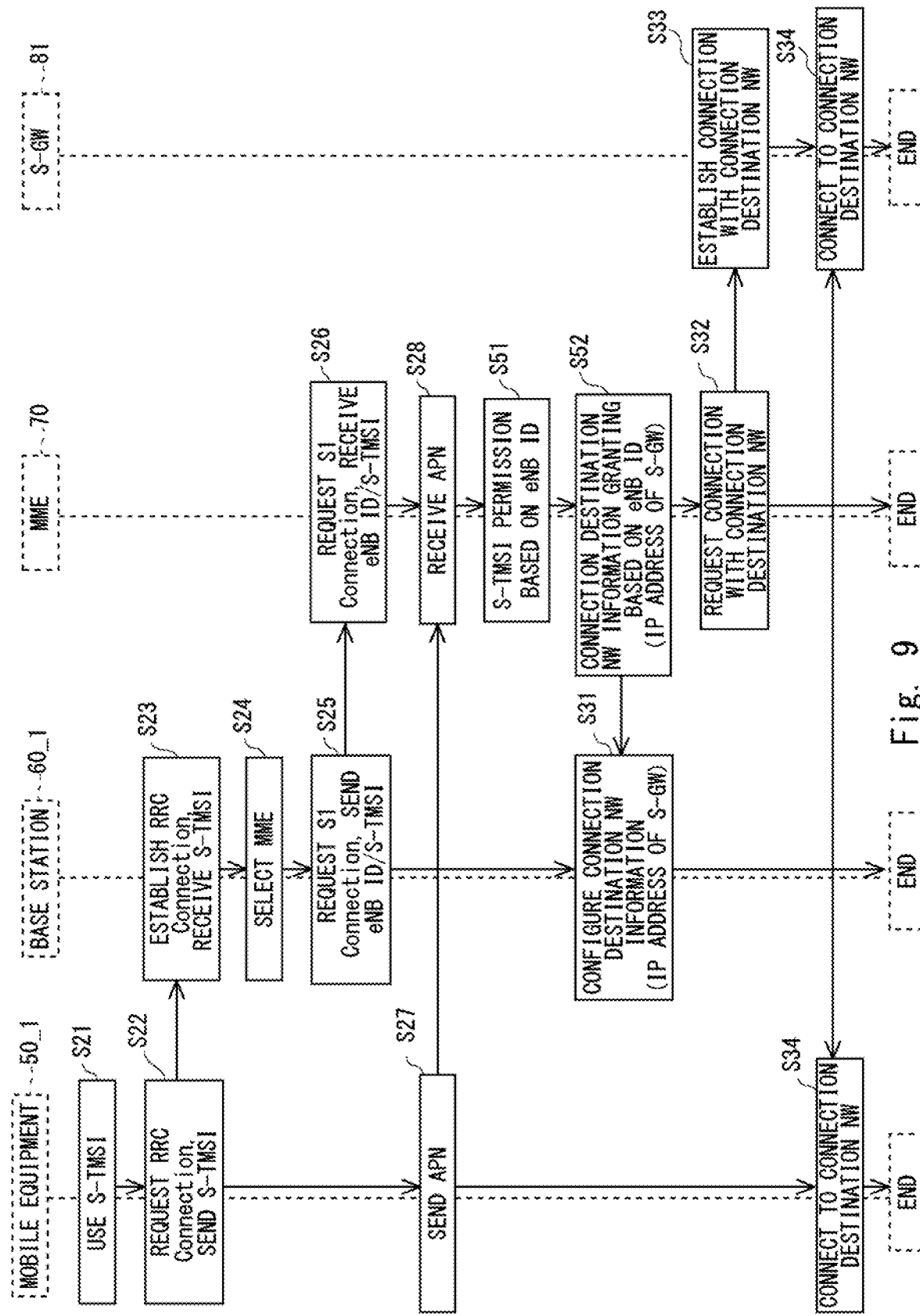
FIG. 9 is a diagram showing an operation example of the radio communication system according to the second example embodiment.

Referring to FIGS. 8 and 9, operation examples of the radio communication system 100 according to the second example embodiment will be described. FIGS. 8 and 9 are diagrams showing the operation examples of the radio communication system according to the second example embodiment.

First, FIG. 8 will be described. FIG. 8, which is a diagram showing a procedure when the Initial Attach is performed, corresponds to FIG. 2. In FIG. 8, Steps S9 and S10 in FIG. 2 are replaced by Steps S41 and S42. For the sake of convenience of explanation, the mobile equipment shown in FIG. 8 is described as the mobile equipment 50_1. Further, descriptions of the operation in FIG. 8 that are common to those in FIG. 2 are omitted as appropriate.

When the MME 70 receives the IMSI and the APN from the mobile equipment 50_1 in Step S8, the MME 70 performs IMSI permission based on the eNB ID using the received IMSI, the service management table T1, and the mobile equipment management table T2 (Step S41). Then, the MME 70 performs UE information granting based on the eNB ID (Step S42).

In this example embodiment, the PLMN and the APN are commonly used for all the service networks. When the mobile equipment 50_1 is connected to the service network 80_1, the MME 70 determines whether the IMSI is permitted using the IMSI of the mobile equipment 50_1 and the eNB ID of the base station 60_1. Therefore, the MME 70 performs IMSI permission and UE information granting based on the eNB ID of the base station 60_1 in Steps S41 and S42 without using the received APN.

Referring next to FIG. 9, descriptions will be given. FIG. 9, which is a diagram showing a procedure when the call connection is performed, corresponds to FIG. 3. FIG. 9 shows a procedure in which Steps S29 and S30 in FIG. 3 are replaced by Steps S51 and S52. Note that the descriptions of the operation in FIG. 9 that are common to those in FIG. 3 are omitted as appropriate.

In Step S28, upon receiving the IMSI and the APN from the mobile equipment 50_1, the MME 70 performs IMSI permission based on the eNB ID using the received IMSI, the service management table T1, and the mobile equipment management table T2 (Step S51). Then, the MME 70 performs connection destination NW information granting based on the eNB ID (Step S52). Specifically, the connection destination NW is the service network 80_1 provided for the mobile equipment 50_1 and the connection destination NW information is the connection information of the service network 80_1.

As described above, in this example embodiment, the PLMN and the APN are commonly used. Therefore, similar to the procedure when the Initial Attach is performed, the MME 70 determines whether the IMSI is permitted using the IMSI of the mobile equipment 50_1 and the eNB ID of the base station 60_1 without using the received APN. That is, the MME 70 performs the IMSI permission and the connection destination NW information granting based on the eNB ID of the base station 60_1 in Steps S51 and S52.

<Operation Examples of MME>

Referring next to FIGS. 10 to 19, sequences in the respective procedures will be described and operation examples of the MME 70 according to the second example embodiment will be described.

<Initial Attach Procedure>

Figure 10:
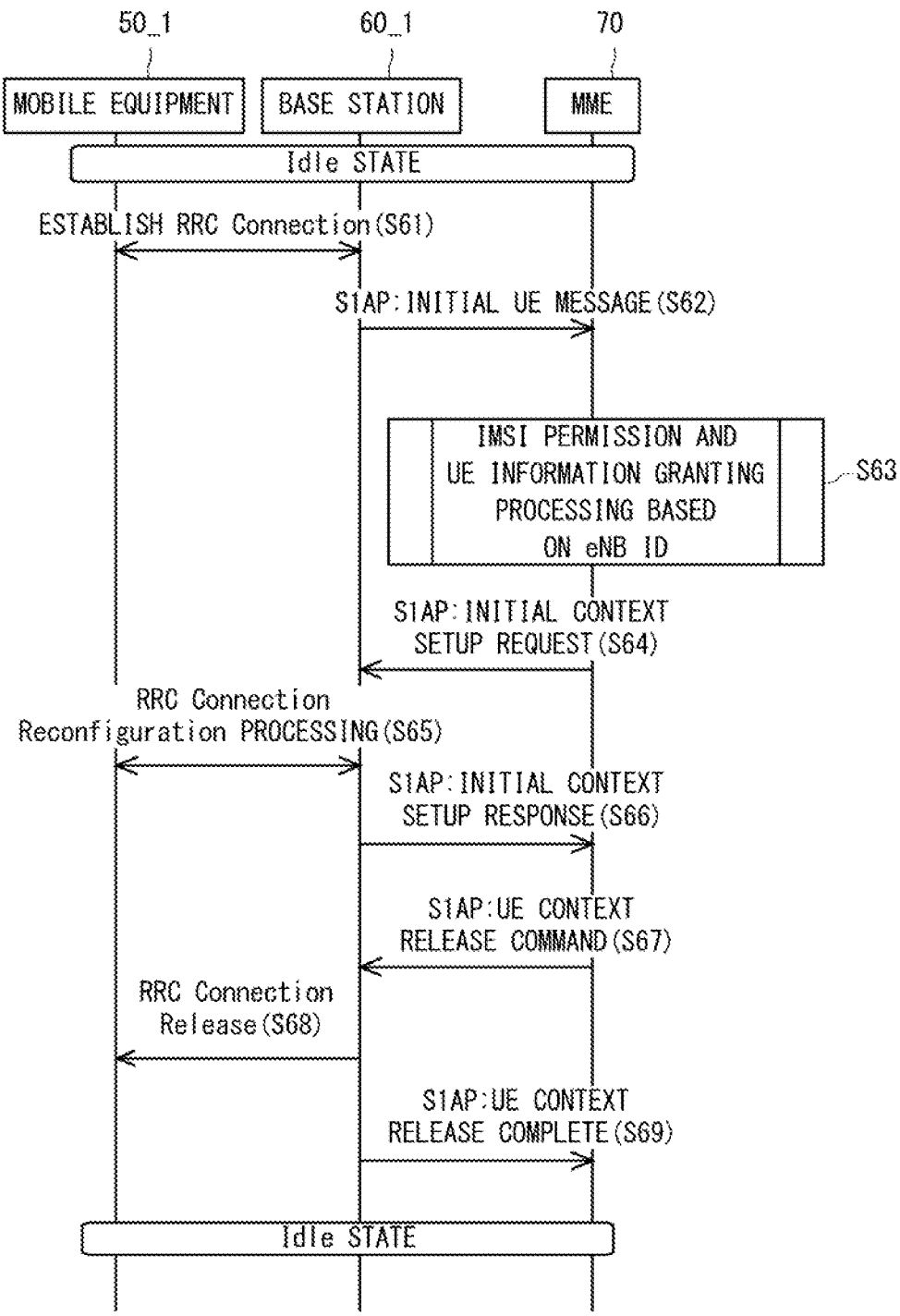
FIG. 10 is a sequence diagram of an Initial Attach procedure.
Figure 11:
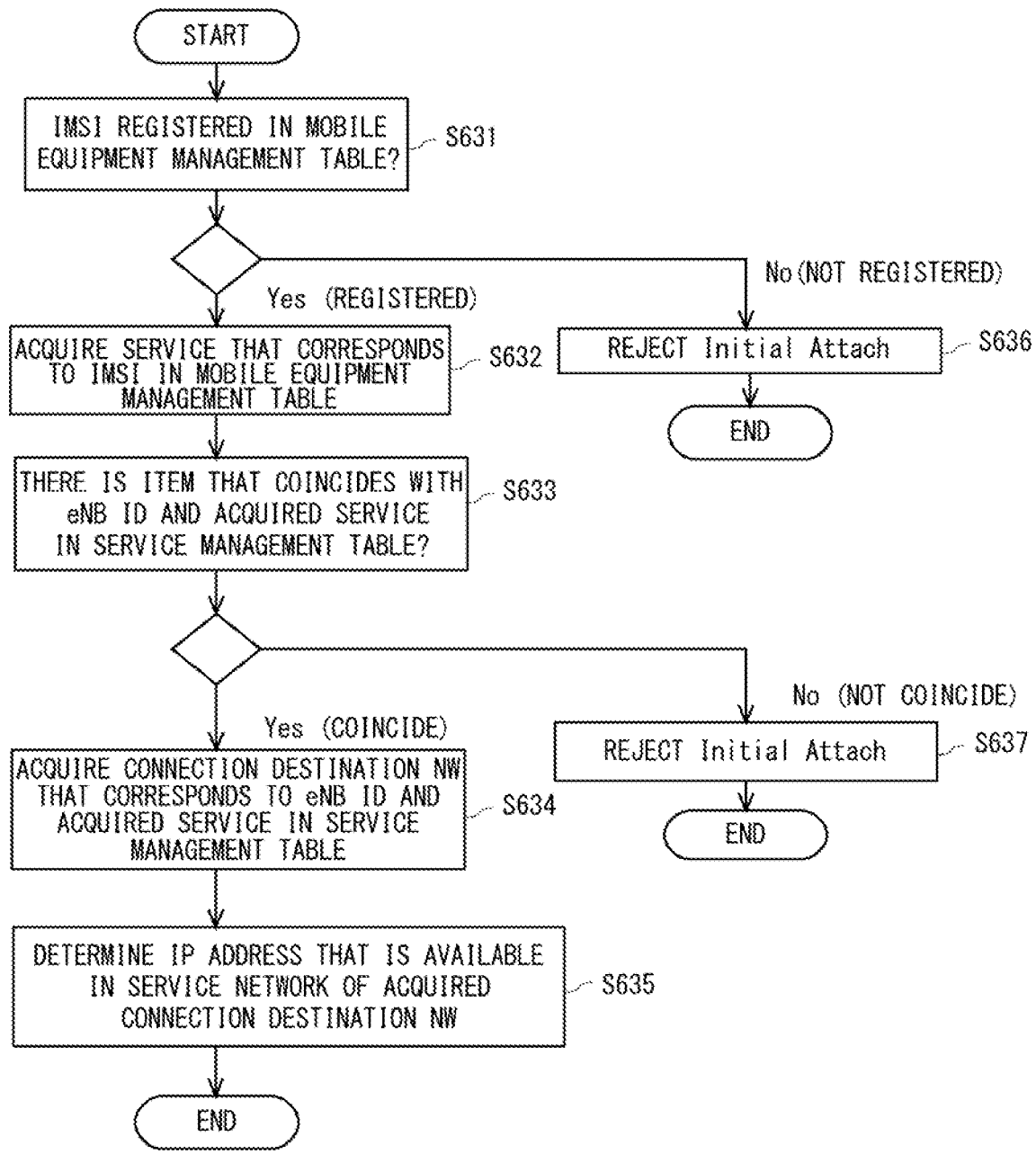
FIG. 11 is a flowchart showing an operation example of an MME in the Initial Attach procedure.

Referring now to FIGS. 10 and 11, the sequence of the Initial Attach procedure that is performed at the time of initial connection and an operation example of the MME 70 will be described. FIG. 10 is a sequence diagram of the Initial Attach procedure. FIG. 11 is a flowchart showing an operation example of the MME in the Initial Attach procedure. Since there is no need to distinguish between the mobile equipment 50_1 and 50_2 in FIGS. 10 and 11 from each other, descriptions will be given using the mobile equipment 50_1. Further, FIG. 10 shows only messages related to this example embodiment and messages that are not related to this example embodiment are omitted.

As an initial state, the mobile equipment 50_1 is in an Idle state since it is not connected to the base station 60_1 and the MME 70. The mobile equipment 50_1 performs RRC Connection establishment with the base station 60_1 (Step S61).

The base station 60_1 transmits an S1AP: INITIAL UE MESSAGE message to the MME 70 (Step S62). Note that Step S62 corresponds to Steps S5 and S6 in FIG. 8.

The MME 70 performs the IMSI permission and the UE information granting processing based on the eNB ID (Step S63).

With reference now to FIG. 11, details of the processing of Step S63 will be described.

The reception unit 72 acquires the IMSI of the mobile equipment 50_1 from the S1AP: INITIAL UE MESSAGE message and the control unit 73 determines whether the acquired IMSI is registered in the mobile equipment management table T2 (Step S631).

The reception unit 72 receives the S1AP: INITIAL UE MESSAGE message. The reception unit 72 confirms that an "S-TMSI" IE is not configured in the S1AP: INITIAL UE MESSAGE message and an "EPS mobile identity" IE of a NAS: ATTACH REQUEST information in this message is configured therein. When the "S-TMSI" IE is not configured in the S1AP: INITIAL UE MESSAGE message and the "EPS mobile identity" IE of the NAS: ATTACH REQUEST information in this message is configured therein, the reception unit 72 determines that the processing is the Initial Attach processing.

The reception unit 72 acquires the IMSI of the mobile equipment 50_1 from the "EPS mobile identity" IE of the S1AP: INITIAL UE MESSAGE message. The control unit 73 searches the mobile equipment management table T2 and determines whether the acquired IMSI is registered in the mobile equipment management table T2.

When the acquired IMSI is registered in the mobile equipment management table T2 (YES in Step S631), the control unit 73 acquires the service that corresponds to the IMSI in the mobile equipment management table T2 (Step S632).

When the acquired IMSI is registered in the mobile equipment management table T2, the control unit 73 acquires a provided service registered in association with the acquired IMSI in the mobile equipment management table T2.

The reception unit 72 acquires the eNB ID of the base station 60_1 from the S1AP: INITIAL UE MESSAGE message and the control unit 73 determines whether there is an item that coincides with the acquired eNB ID and the acquired service in the service management table T1 (Step S633).

The reception unit 72 acquires the eNB ID of the base station 60_1 from the "eNB ID" IE contained in the "Cell Identity" IE in the "E-UTRAN CGI" IE of the received S1AP: INITIAL UE MESSAGE message. The control unit 73 determines whether there is a row in which the eNB ID in the provided area in the service management table T1 coincides with the acquired eNB ID and the provided service in the service management table T1 coincides with the service acquired in Step S632.

When there is an item that coincides with the acquired eNB ID and service in the service management table T1 (YES in Step S633), the control unit 73 acquires the connection destination NW that corresponds to the eNB ID and the acquired service in the service management table T1 (Step S634).

The control unit 73 acquires the connection destination NW in a row in which the eNB ID in the provided area in the service management table T1 coincides with the acquired eNB ID and the provided service of the service management table T1 coincides with the service acquired in Step S633.

The control unit 73 determines the IP address that is available in the service network of the acquired connection destination NW (Step S635).

The control unit 73 determines the IP address that is available in the service network of the acquired connection destination NW. Then, the transmission unit 74 configures the determined IP address in the "PDN Address" IE of the NAS: ACTIVATE DEFAULT EPS BEARER CONTEXT REQUEST message to be stored in the S1AP: INITIAL CONTEXT SETUP REQUEST message that will be described later.

When the acquired IMSI is not registered in the mobile equipment management table T2 in Step S631 (NO in Step S631), the control unit 73 determines that this user is a user who is not permitted to receive service and then rejects the Initial Attach (Step S636).

When there is no item that coincides with the acquired eNB ID and the acquired service in the service management table T1 in Step S633 (NO in Step S633), the control unit 73 rejects the Initial Attach (Step S637).

Referring once again to FIG. 10, the explanation will be continued.

The transmission unit 74 of the MME 70 transmits the S1AP: INITIAL CONTEXT SETUP REQUEST message to the base station 60_1 (Step S64). The base station 60_1 acquires the IP address determined by the control unit 73 in Step S635 from the S1AP: INITIAL CONTEXT SETUP REQUEST message. Note that Step S64 corresponds to Steps S42 and S11 in FIG. 8.

The mobile equipment 50_1 and the base station 60_1 perform RRC Connection Reconfiguration processing (Step S65) and the base station 60_1 transmits the S1AP: INITIAL CONTEXT SETUP RESPONSE message to the MME 70 (Step S66).

The MME 70 transmits an S1AP: UE CONTEXT RELEASE COMMAND message to the base station 60_1 (Step S67). The base station 60_1 transmits the RRC Connection Release message to the mobile equipment 50_1 (Step S68), transmits the S1AP: UE CONTEXT RELEASE COMPLETE message to the MME 70 (Step S69), and the Initial Attach processing is ended.

<Call Connection Procedure>

Figure 12:
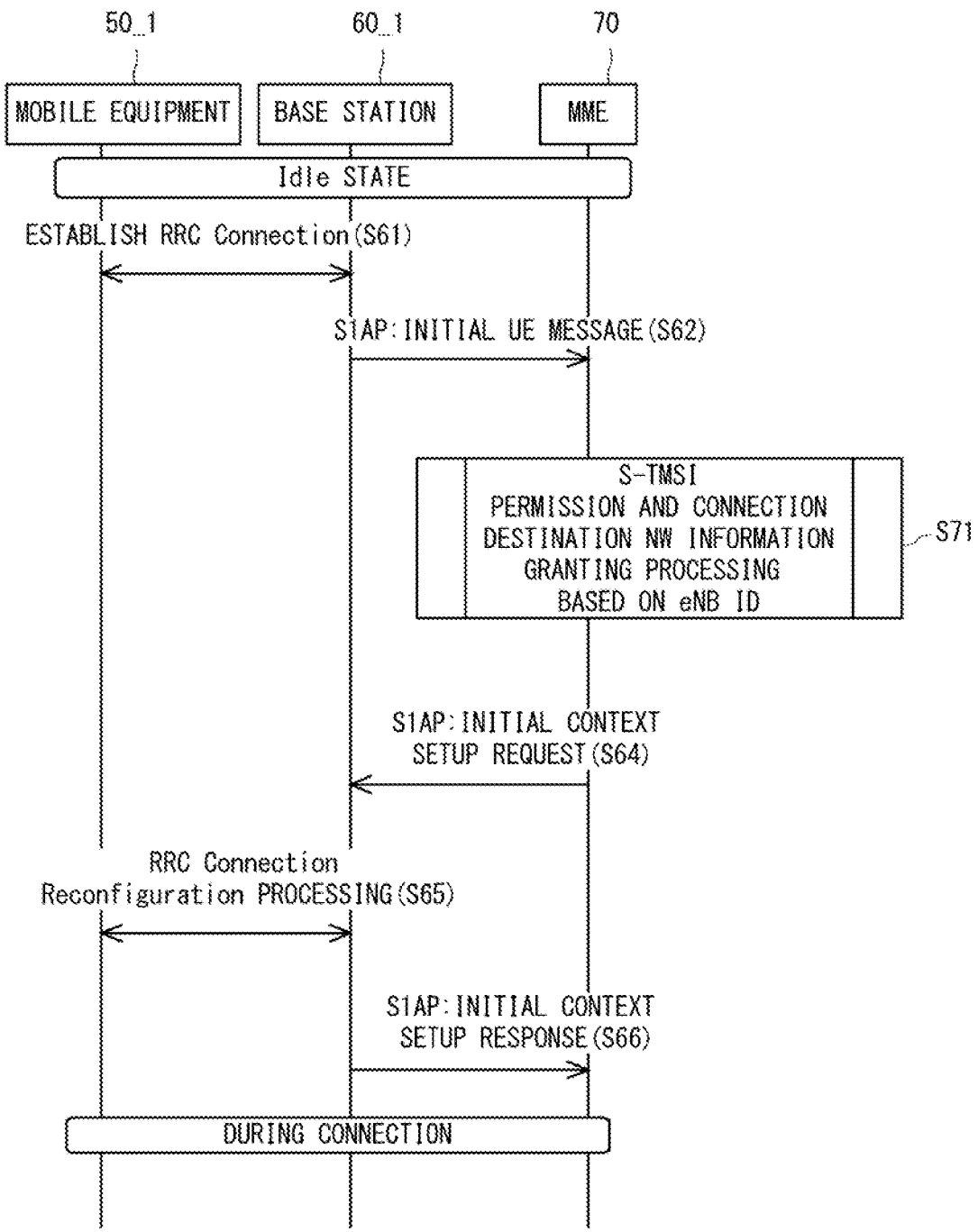
FIG. 12 is a sequence diagram of a call connection procedure.
Figure 13:
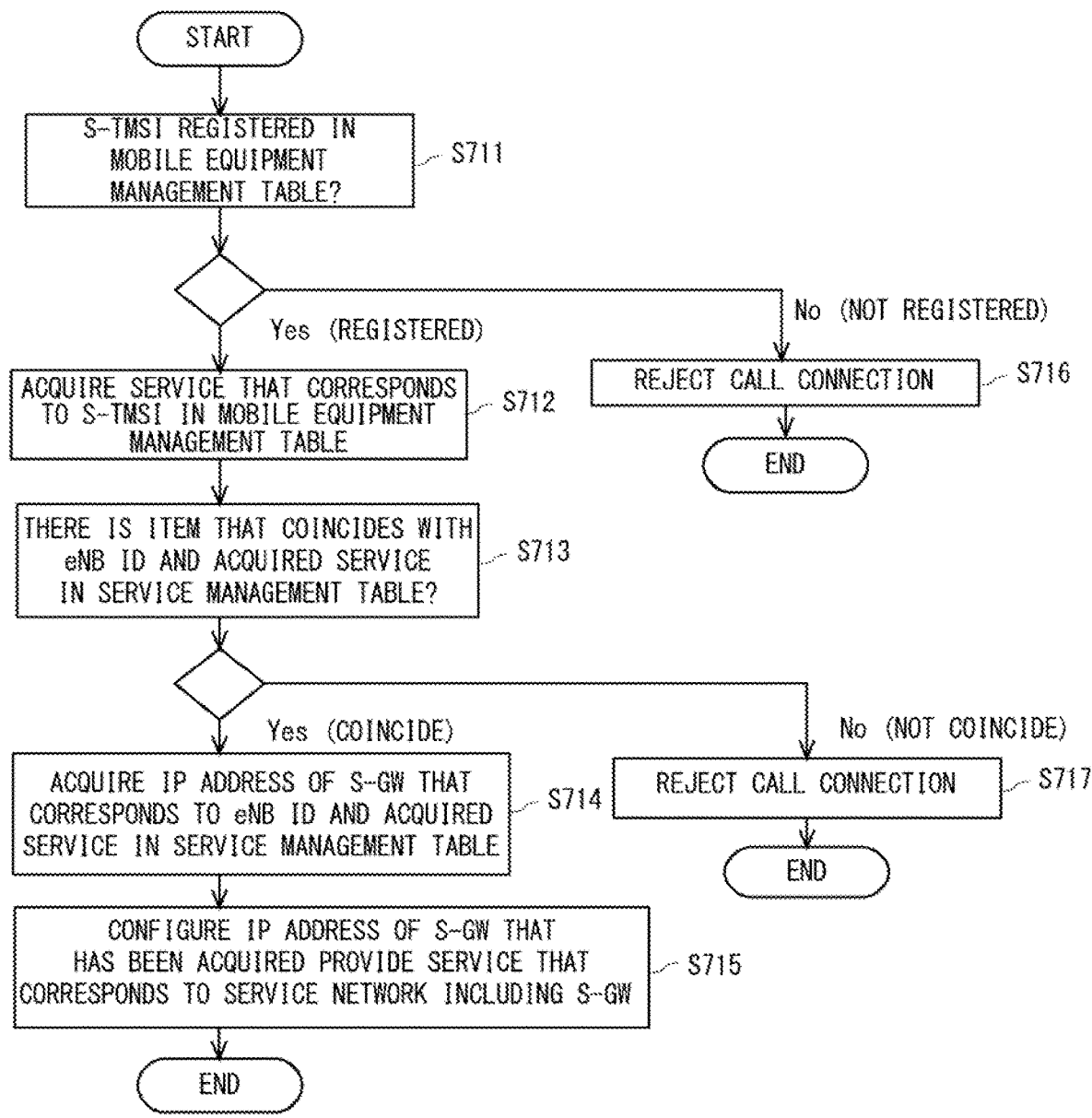
FIG. 13 is a flowchart showing an operation example of an MME in the call connection procedure.
Figure 14:
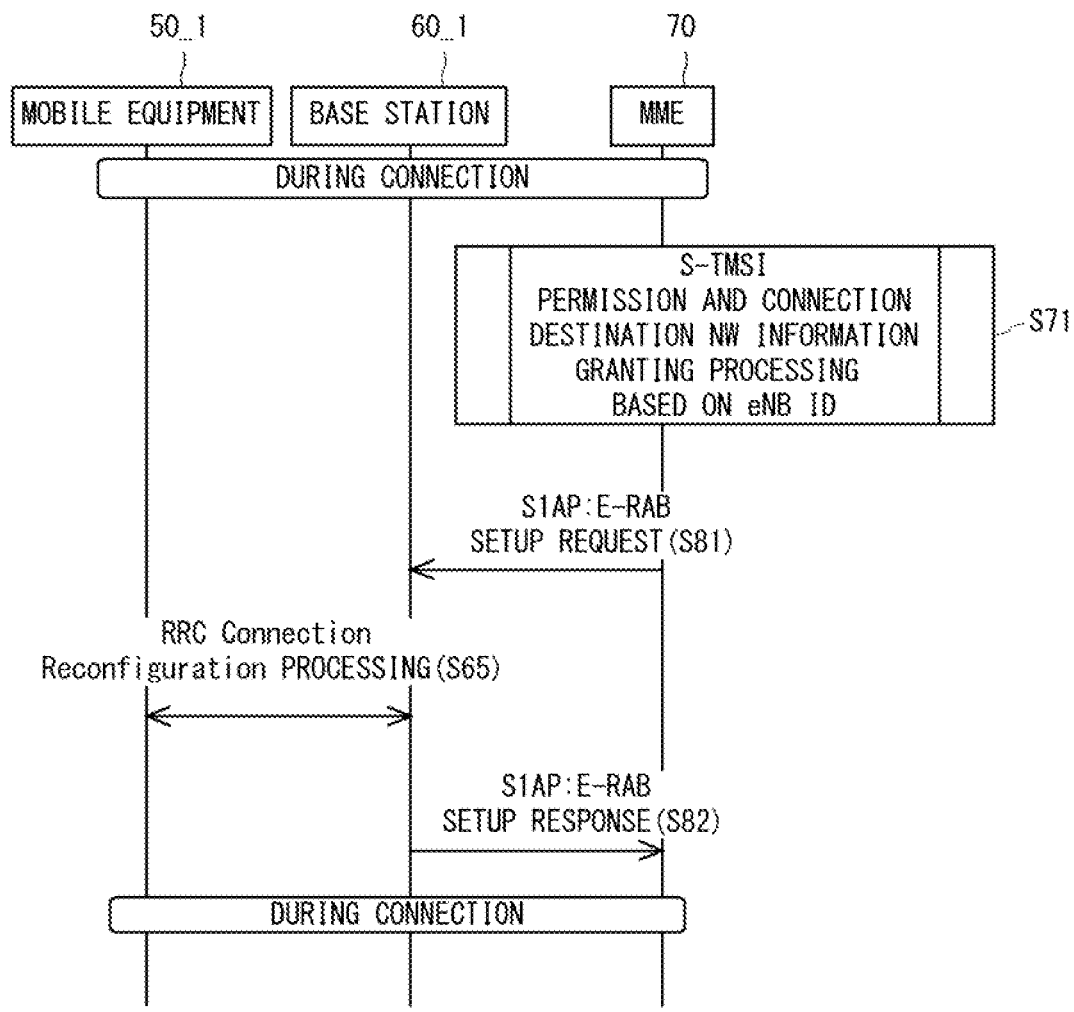
FIG. 14 is a sequence diagram of the call connection procedure.

With reference to FIGS. 12 to 14, a sequence of the call connection procedure and an operation example of the MME 70 will be described. FIG. 12, which is a sequence diagram of the call connection procedure, is a sequence diagram of an Initial context setup procedure. FIG. 13 is a flowchart showing an operation example of the MME in the call connection procedure. FIG. 14 is a sequence diagram of an E-RAB setup procedure that may be executed after the call connection procedure (Initial context setup procedure).

The processes up to Step S66 in the sequence diagram in FIG. 10 are basically similar to that in FIG. 12. Therefore, in FIG. 12, processes that are common to those in FIG. 10 are denoted by the same reference symbols and duplicate descriptions will be omitted as appropriate.

FIG. 12 is different from FIG. 10 in that Step S63 in FIG. 10 is replaced by Step S71 in FIG. 12 and the state of the mobile equipment 50_1 after the procedure is in the state of being connected, not the Idle state. FIGS. 12 and 14 show only the messages that are related to this example embodiment and the messages that are not related to this example embodiment are omitted.

Upon receiving the S1AP: INITIAL UE MESSAGE message (Step S62), the MME 70 performs S-TMSI permission and connection destination NW information granting processing based on the eNB ID (Step S71).

Referring now to FIG. 13, details of the processing of Step S71 will be described.

The reception unit 72 acquires the S-TMSI of the mobile equipment 50_1 from the S1AP: INITIAL UE MESSAGE message and the control unit 73 determines whether the acquired S-TMSI is registered in the mobile equipment management table T2 (Step S711).

The reception unit 72 receives the S1AP: INITIAL UE MESSAGE message. The reception unit 72 confirms that the "S-TMSI" IE is configured in the S1AP: INITIAL UE MESSAGE message. The reception unit 72 acquires the S-TMSI of the mobile equipment 50_1 from the "S-TMSI" IE of the S1AP: INITIAL UE MESSAGE message.

The control unit 73 searches the mobile equipment management table T2 and determines whether the acquired S-TMSI is registered in the mobile equipment management table T2.

When the acquired S-TMSI is registered in the mobile equipment management table T2 (YES in Step S711), the control unit 73 acquires the service that corresponds to the S-TMSI in the mobile equipment management table (Step S712).

When the acquired S-TMSI is registered in the mobile equipment management table T2, the control unit 73 acquires the provided service that is registered in association with the acquired S-TMSI in the mobile equipment management table T2.

The reception unit 72 acquires the eNB ID of the base station 60_1 from the S1AP: INITIAL UE MESSAGE message and the control unit 73 determines whether there is an item that coincides with the acquired eNB ID and the acquired service in the service management table T1 (Step S713).

The reception unit 72 acquires the eNB ID of the base station 60_1 from the "eNB ID" IE contained in the "Cell Identity" IE in the "E-UTRAN CGI" IE of the received S1AP: INITIAL UE MESSAGE message. The control unit 73 determines whether there is a row in which the eNB ID in the provided area in the service management table T1 coincides with the acquired eNB ID and the provided service in the service management table T1 coincides with the service acquired in Step S712.

When there is an item that coincides with the acquired eNB ID and service (YES in Step S713), the control unit 73 acquire the IP address of the S-GW that corresponds to the eNB ID and the acquired service in the service management table T1 (Step S714).

The control unit 73 acquires the connection destination SGW IP address in the row in which the eNB ID coincides with the acquired eNB ID and the provided service coincides with the service acquired in Step S713 in the service management table T1.

The control unit 73 configures the IP address of the S-GW that has been acquired and the service network including this S-GW provides the corresponding service (Step S715).

The control unit 73 configures the IP address configured in the acquired connection destination SGW IP address. Then the transmission unit 74 configures the IP address configured in the acquired connection destination SGW IP address in the "Transport Layer Address" IE of the S1AP: INITIAL CONTEXT SETUP REQUEST message.

When the acquired S-TMSI is not registered in the mobile equipment management table T2 in Step S711 (NO in Step S711), the control unit 73 determines that this user is a user who is not permitted to receive service and then rejects the call connection (Step S716).

When there is no item that coincides with the acquired eNB ID and the acquired service in the service management table T1 in Step S713 (NO in Step S713), the control unit 73 rejects the call connection (Step S717).

While the sequence of Step S64 and the subsequent processing in FIG. 12 is executed when the processing shown in FIG. 13 is ended, the descriptions thereof will be omitted since this sequence is similar to that in FIG. 10. The base station 60_1 acquires the IP address determined by the control unit 73 from the S1AP: INITIAL CONTEXT SETUP REQUEST message in Step S715. When the call connection processing is completed, the mobile equipment 50_1 is in the state of being connected.

Referring to FIG. 14, the E-RAB setup procedure will be described. FIG. 14, which is a sequence diagram of the E-RAB setup procedure, is a procedure that may be executed in or after FIG. 12.

When the E-RAB setup procedure is performed, the transmission unit 74 configures the IP address of the acquired connection destination SGW IP address in the "Transport Layer Address" IE of the "E-RAB to be Setup Item IEs" IE in the "E-RAB to be Setup List" IE of the S1AP: E-RAB SETUP REQUEST message. Then, the transmission unit 74 transmits an S1AP: E-RAB SETUP REQUEST message to the base station 60_1. The base station 60_1 acquires the IP address determined by the control unit 73 from the S1AP: E-RAB SETUP REQUEST message in Step S715.

The base station 60_1 and the mobile equipment 50_1 perform the RRC Connection Reconfiguration processing (Step S65), the base station 60_1 transmits the S1AP: E-RAB SETUP RESPONSE message to the MME 70 (Step S82), and the call connection processing is completed.

<S1-Handover Procedure>

Figure 15:
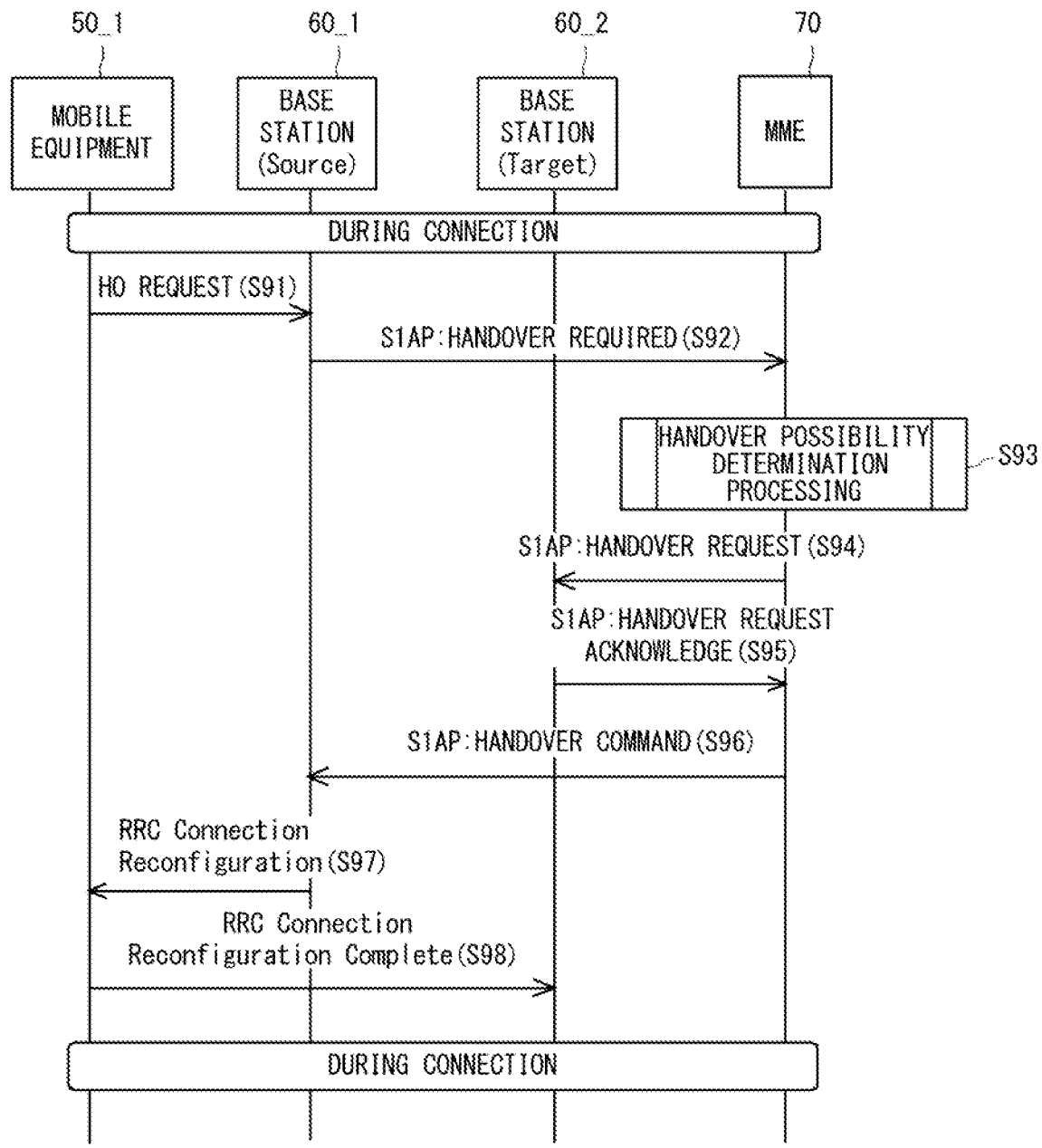
FIG. 15 is a sequence diagram of an S1-Handover procedure.
Figure 16:
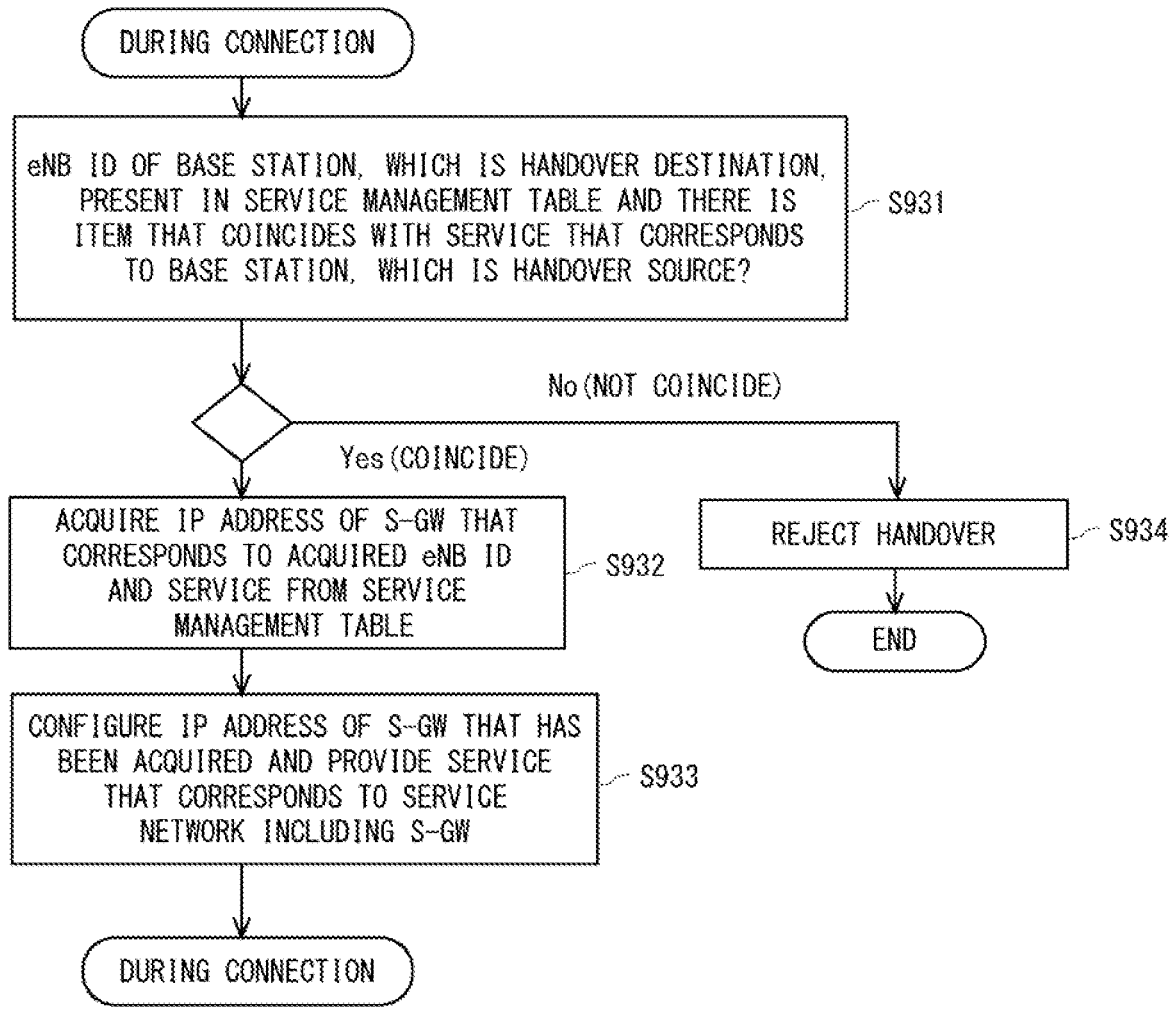
FIG. 16 is a flowchart showing an operation example of an MME in a Handover procedure.

With reference to FIGS. 15 and 16, the sequence of the S1-Handover procedure and an operation example of the MME 70 will be described. FIG. 15 is a sequence diagram of the S1-Handover procedure. FIG. 16 is a flowchart showing the operation example of the MME in the Handover procedure.

FIG. 15 is a sequence diagram when the mobile equipment 50_1 performs S1-Handover from the base station 60_1 to the base station 60_2. FIG. 15 shows only the messages that are related to this example embodiment and the messages that are not related to this example embodiment are omitted.

The mobile equipment 50_1 transmits a Handover (HO) request to the base station 60_1 (Step S91), and the base station 60_1 transmits an S1AP: HANDOVER REQUIRED message to the MME 70 (Step S92). The MME 70 performs handover possibility determination processing (Step S93).

Referring now to FIG. 16, details of the processing of Step S93 will be described.

The reception unit 72 acquires the eNB ID of the base station 60_2 from the S1AP: HANDOVER REQUIRED message and the control unit 73 determines whether there is an item that coincides with the service that corresponds to the eNB ID of the base station 60_2 and the base station 60_1 (Step S931).

The reception unit 72 receives the S1AP: HANDOVER REQUIRED message. The reception unit 72 acquires the eNB ID of the base station 60_2, which is the handover destination, from the "eNB ID" IE contained in the "Global eNB ID" of the "Target eNB-ID" IE in the "Target ID" IE of the S1AP: HANDOVER REQUIRED message.

The control unit 73 holds information regarding the provided service that corresponds to the base station 60_1, which is the handover source, when the Initial Attach or the call connection is performed. The control unit 73 searches the service management table T2 and determines whether there is a row in which the eNB ID of the base station 60_2, which is the handover destination, is associated with the provided service that corresponds to the base station 60_1, which is the handover source.

When there is an item that coincides with the acquired eNB ID and the acquired service (YES in Step S931), the control unit 73 acquires the IP address of the S-GW that corresponds to the acquired eNB ID and the service from the service management table T2 (Step S932).

The control unit 73 acquires the connection destination SGW IP address in the row in which the eNB ID of the base station 60_2, which is the handover destination, is associated with the provided service that corresponds to the base station 60_1, which is the handover source, from the service management table T2.

The control unit 73 configures the IP address of the S-GW that has been acquired, and a service network including this SGW provides the corresponding service (Step S933).

The control unit 73 configures an IP address configured in the acquired connection destination SGW IP address. Then the transmission unit 74 configures the acquired IP address of the SGW in the "Transport Layer Address" IE in the "E-RABs To Be Setup Item IEs" IE included in the "E-RABs To Be Setup List" IE in the S1AP: HANDOVER REQUEST message, and continues S1-Handover processing. In this case, Step S94 and the following processing in FIG. 15 are executed.

On the other hand, when there is no item that coincides with the acquired eNB ID and the acquired service (NO in Step S931), the control unit 73 determines that the mobile equipment 50_1 is a user who is not permitted to receive service and then rejects the handover (Step S934). Note that, in this case, the control unit 73 may perform control so as to reject the handover and continue call processing in the base station 60_1, which is the handover source.

Referring once again to FIG. 15, the explanation will be continued.

The transmission unit 74 of the MME 70 transmits the S1AP: HANDOVER REQUEST message to the base station 60_2 (Step S94). Upon receiving the S1AP: HANDOVER REQUEST message, the base station 60_2 transmits an S1AP: HANDOVER REQUEST ACKNOWLEDGE message to the MME 70 (Step S95). Upon receiving the S1AP: HANDOVER REQUEST ACKNOWLEDGE message, the MME 70 transmits an S1AP: HANDOVER COMMAND message to the base station 60_1 (Step S96). Upon receiving the S1AP: HANDOVER COMMAND message, the base station 60_1 transmits an RRC Connection Reconfiguration message to the mobile equipment 50_1 (Step S97), and the mobile equipment 50_1 performs the RRC Connection Reconfiguration processing. When the RRC Connection Reconfiguration processing is completed, the mobile equipment 50_1 transmits an RRC Connection Reconfiguration Complete message to the base station 60_2 (Step S98), and the S1-Handover processing is ended.

<X2-Handover Procedure>

Figure 17:
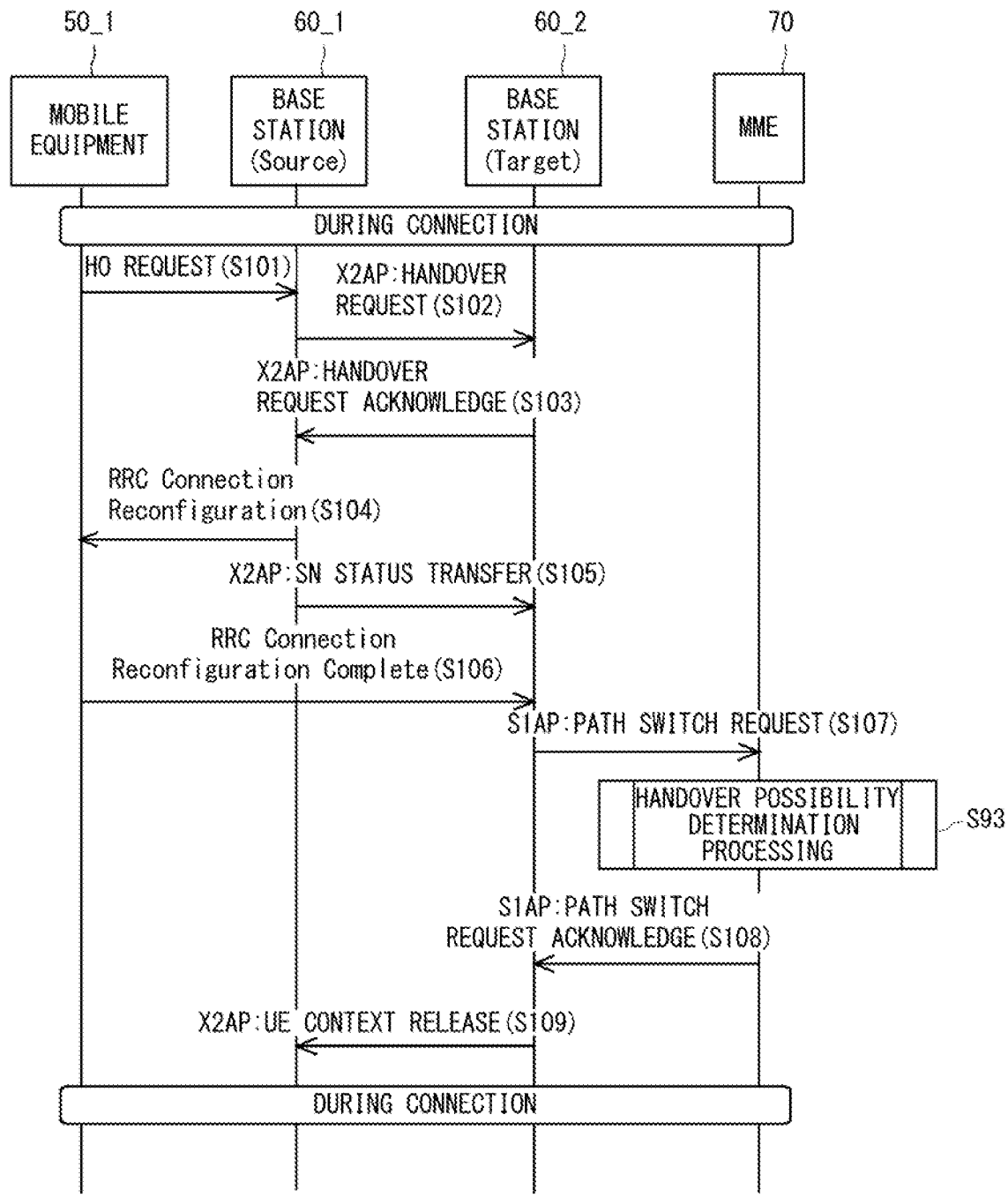
FIG. 17 is a sequence diagram of an X2-Handover procedure.

With reference to FIG. 17, the sequence of the X2-Handover procedure and an operation example of the MME 70 will be described. FIG. 17 is a sequence diagram of the X2-Handover procedure. Since the handover possibility determination processing in FIG. 17 differs only in part from the handover possibility determination processing in the S1-Handover procedure, descriptions of the details of the handover possibility determination processing will be omitted.

FIG. 17 is a sequence diagram of a case in which the mobile equipment 50_1 performs X2-Handover from the base station 60_1 to the base station 60_2. FIG. 17 shows only the messages that are related to this example embodiment and the messages that are not related to this example embodiment are omitted.

The mobile equipment 50_1 transmits an HO request to the base station 60_1 (Step S101), and the base station 60_1 transmits an X2AP: HANDOVER REQUEST message to the base station 60_2 (Step S102). The base station 60_2 transmits an X2AP: HANDOVER REQUEST ACKNOWLEDGE message to the base station 60_1 (Step S103).

The base station 60_1 transmits an RRC Connection Reconfiguration message to the mobile equipment 50_1 (Step S104), and transmits an X2AP: SN STATUS TRANSFER message to the base station 60_2 (Step S105). When the RRC Connection Reconfiguration processing is completed, the mobile equipment 50_1 transmits an RRC Connection Reconfiguration Complete message to the base station 60_2 (Step S106).

The base station 60_2 transmits an S1AP: PATH SWITCH REQUEST message to the MME 70 (Step S107), and the MME 70 performs handover possibility determination processing (Step S93).

In the handover possibility determination processing, the reception unit 72 of the MME 70 acquires the eNB ID of the base station 60_2 from the "eNB ID" IE contained in the "Cell Identity" IE in the "E-UTRAN CGI" IE of the S1AP: PATH SWITCH REQUEST message and performs processing. The transmission unit 74 configures, in a "Transport layer address" in the "E-RABs Switched in Uplink Item IEs" IE included in the "E-RAB To Be Switched in Uplink List" IE of an S1AP: PATH SWITCH REQUEST ACKNOWLEDGE message, the IP address of the SGW that the control unit 73 has acquired.

The transmission unit 74 of the MME 70 transmits the S1AP: PATH SWITCH REQUEST ACKNOWLEDGE message to the base station 60_2 (Step S108). The base station 60_2 transmits an X2AP: UE CONTEXT RELEASE message to the base station 60_1 (Step S109) and the X2-Handover processing is ended.

<Attach and TA Update Procedure>

Figure 18:
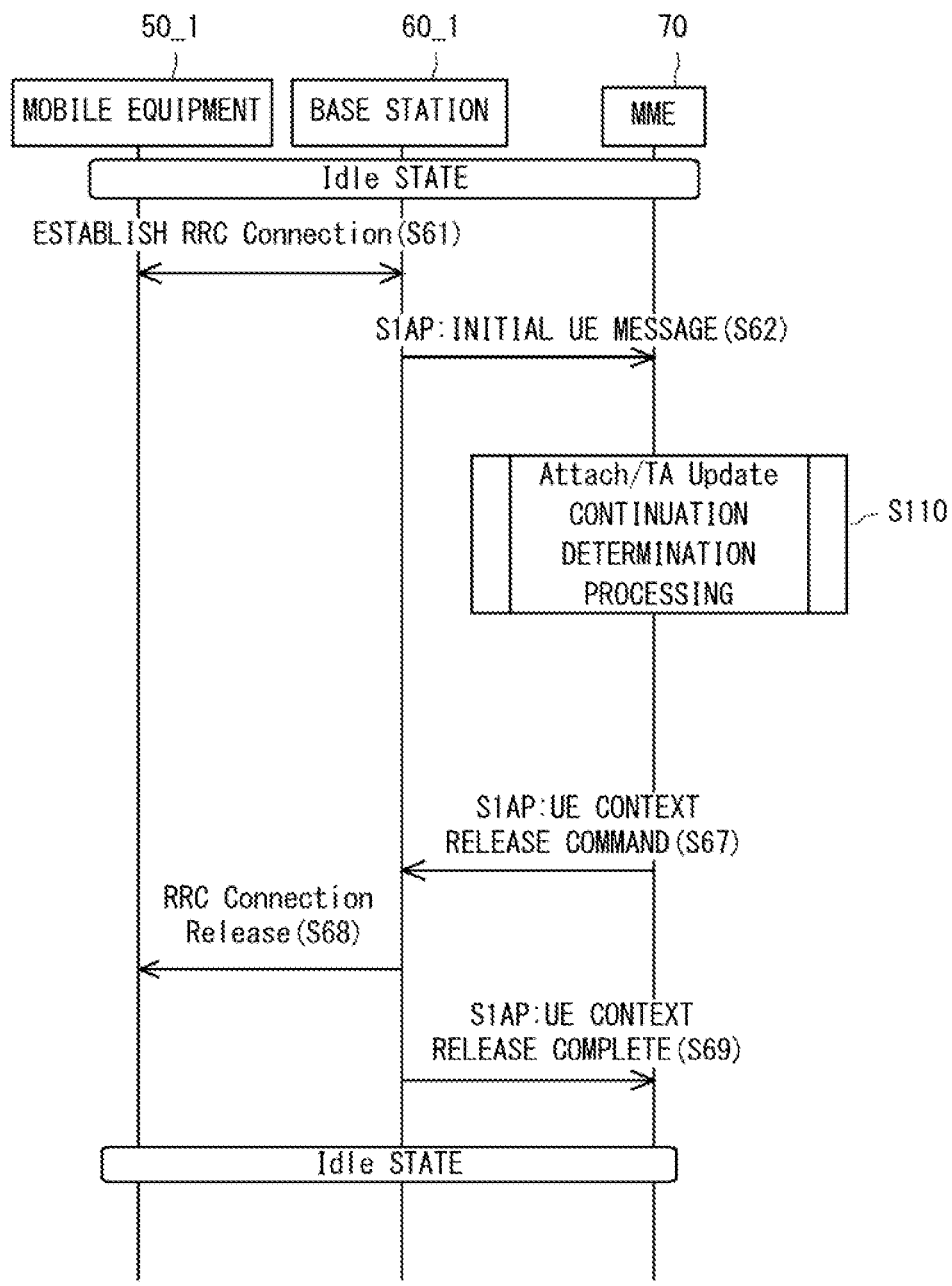
FIG. 18 is a sequence diagram of an Attach procedure and a TA Update procedure.
Figure 19:
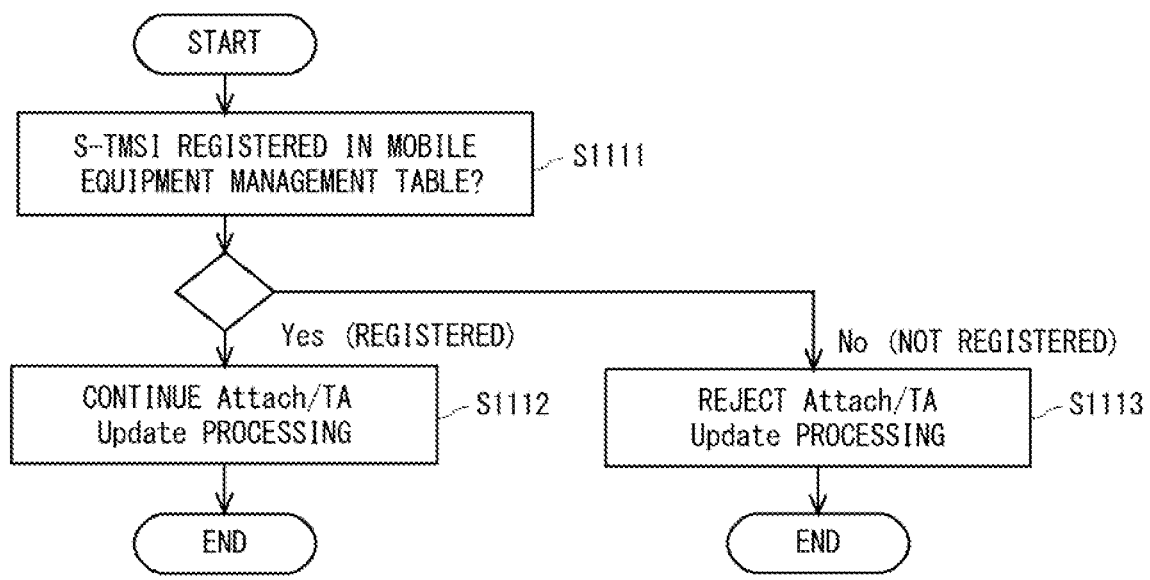
FIG. 19 is a flowchart showing an operation example of the MME in the Attach procedure and the TA Update procedure.

Referring to FIGS. 18 and 19, the sequence of the Attach procedure and the TA Update procedure after the Initial Attach, and an operation example of the MME 70 will be described. FIG. 18 is a sequence diagram of the Attach procedure and the TA Update procedure. FIG. 19 is a flowchart showing the operation example of the MME in the Attach procedure and the TA Update procedure.

Since FIG. 18 is basically similar to FIG. 10 except that the procedure in Steps S63 to S66 in FIG. 10 is not included in FIG. 18, the reference symbols the same as those given in FIG. 10 are given in FIG. 18 and descriptions thereof are omitted as appropriate. FIG. 18 shows only the messages that are related to this example embodiment and the messages that are not related to this example embodiment are omitted.

In the Attach and the TA Update procedure, the processing in which the mobile equipment 50_1 is connected to the service network 80_1 that provides the service for the mobile equipment 50_1 is not performed, unlike the Initial Attach procedure and the call connection procedure. Therefore, the processing content of the Attach and the TA Update procedure is different from that of the Initial Attach procedure.

After the base station 60_1 transmits the S1AP: INITIAL UE MESSAGE message to the MME 70 (Step S62), the MME 70 performs Attach/TA Update continuation determination processing (Step S110).

Referring now to FIG. 19, details of the processing of Step S110 will be described.

The reception unit 72 acquires the S-TMSI of the mobile equipment 50_1 from the S1AP: INITIAL UE MESSAGE message and the control unit 73 determines whether the acquired S-TMSI is registered in the mobile equipment management table T2 (Step S1111).

The reception unit 72 receives the S1AP: INITIAL UE MESSAGE message. The reception unit 72 confirms that the "S-TMSI" IE is configured in the S1AP: INITIAL UE MESSAGE message. The reception unit 72 acquires the S-TMSI of the mobile equipment 50_1 from the "S-TMSI" IE of the S1AP: INITIAL UE MESSAGE message. The control unit 73 searches the mobile equipment management table T2 and determines whether the acquired S-TMSI is registered in the mobile equipment management table T2.

When the acquired S-TMSI is registered in the mobile equipment management table T2 (YES in Step S1111), the control unit 73 continues the Attach processing and the TA Update processing (Step S1112). In this case, Step S67 and the subsequent processing in FIG. 18 are executed.

On the other hand, when the acquired S-TMSI is not registered in the mobile equipment management table T2 (NO in Step S1111), the control unit 73 determines that this user is a user who is not permitted to receive service and then rejects the Attach processing and the TA Update processing (Step S1113).

As described above, when the Initial Attach is performed and the call connection is performed, the MME 70 determines whether the service that corresponds to the identification information of the mobile equipment coincides with the service that corresponds to the identification information of the base station. That is, when the mobile equipment is connected to the service network, the MME 70 determines whether the service provided for the mobile equipment coincides with the service whose provided area is the communication area of the base station.

The MME 70 transmits the connection information of the service network to the base station when the service provided for the mobile equipment coincides with the service whose provided area is the communication area of the base station. The base station enables the mobile equipment and the service network to be able to communicate with each other using the connection information of the service network.

In this example embodiment, the PLMN and the APN are common in all the service networks, and the MME 70 performs control using information configured in the service management table T1 and the mobile equipment management table T2. That is, when the mobile equipment is connected to the service network, the MME 70 performs control without using the network identification information such as the PLMN or the APN. Therefore, according to the MME 70 according to the second example embodiment, it becomes possible to cause a communication terminal to be connected to an appropriate service network regardless of the network identification information.

Further, when a handover is performed, and when Attach and TA Update are performed as well, the MME 70 performs control using the information configured in the service management table T1 and the mobile equipment management table T2, and does not use the network identification information. Accordingly, with the MME 70 according to the second example embodiment, it becomes possible to perform control in each procedure without depending on network identification information in a radio communication system in which the PLMN and the APN are commonly used.

Modified Example

In the aforementioned second example embodiment, the MME 70 is described to hold the service management table T1 and the mobile equipment management table T2 in the storage unit 71 and update these tables. The service management table T1 and the mobile equipment management table T2 may be held and updated in another communication apparatus that the MME 70 can access, not being held by the MME 70.

For example, a Home Subscriber Server (HSS) may hold the service management table T1 and the mobile equipment management table T2. Then, the MME 70 may receive information configured in the service management table T1 and the mobile equipment management table T2 from the HSS and perform the processing in the second example embodiment described above. In this case, the MME 70 may not include the storage unit 71. With this configuration as well, the effects similar to those in the second example embodiment can be achieved.

OPERATION EXAMPLES

Hereinafter, operation examples using the MME 70 according to the second example embodiment or modified examples of the second example embodiment will be described. As a matter of course, the following operation examples are merely examples and are not limited to the following operation examples.

Operation Example 1: Providing Services Different from Each Other for Each Base Station and Each Mobile Equipment An operation example for providing services different from each other for each base station and each mobile equipment in a radio communication system in which the PLMN and the APN are commonly used will be described.

Figure 20:
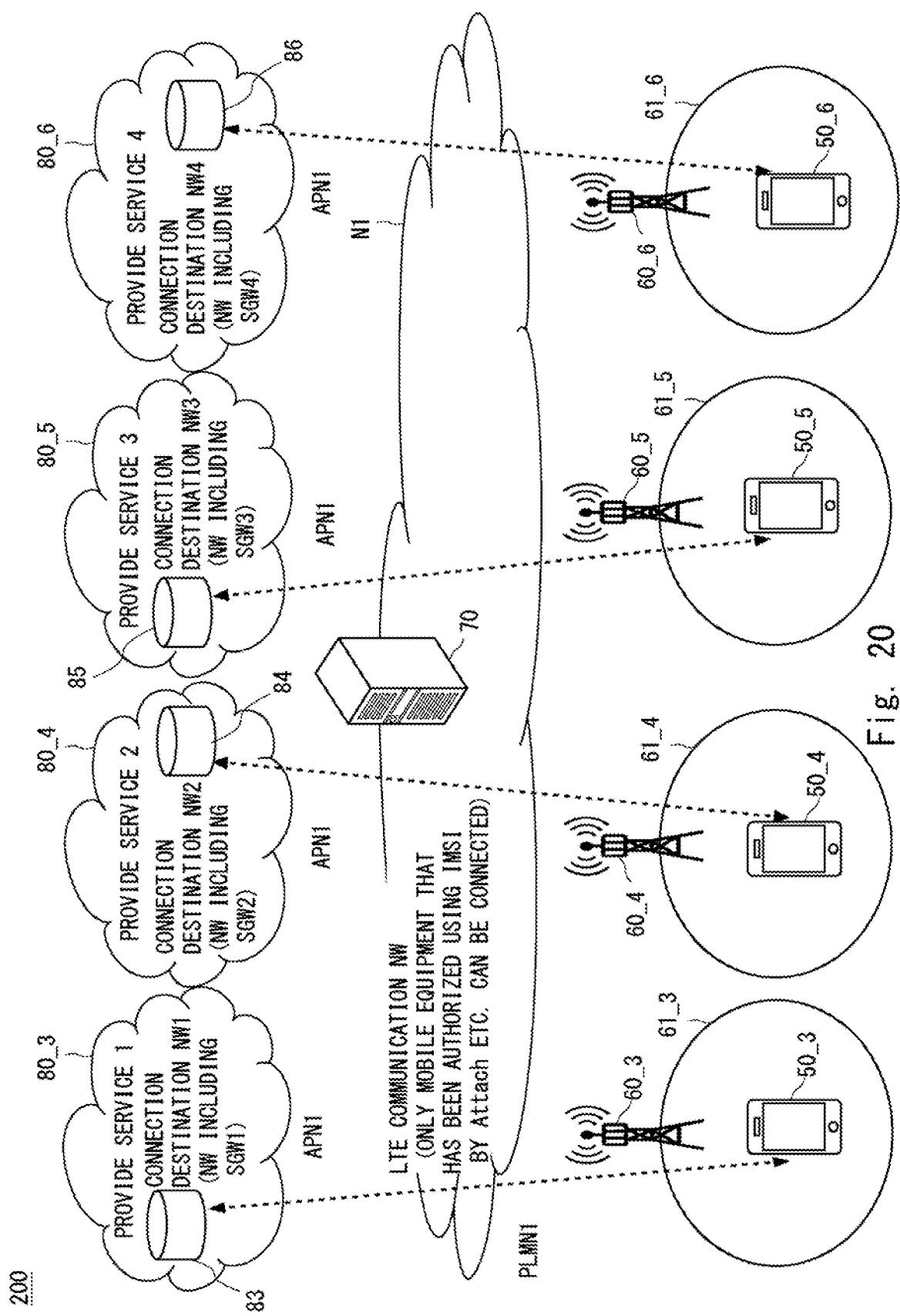
FIG. 20 is a diagram showing one example of a radio communication system according to an operation example 1.

FIG. 20 is a diagram showing one example of the radio communication system according to the operation example 1. A radio communication system 200 includes mobile equipment 50_3 to 50_6, base stations 60_3 to 60_6, an MME 70, and service networks 80_3 to 80_6.

First, assumptions in the operation example 1 and the other operation examples described later will be described.

The mobile equipment 50_3 to 50_6 are mobile equipment referred to as mobile equipment 1 to 4, respectively. The mobile equipment 50_3 to 50_6 are respectively configured with IMSI1 to IMSI4. When the S-TMSI is assigned, the mobile equipment 50_3 to 50_6 are respectively assigned with STMSI1 to STMSI4.

The eNB Names of the base stations 60_3 to 60_6 are respectively base stations 1 to 4, and the eNB IDs thereof are respectively eNB ID1 to eNB ID4. The communication areas of the base stations 60_3 to 60_6 are respectively denoted by communication areas 61_3 to 61_6.

The service networks 80_3 to 80_6 respectively include S-GWs 83 to 86. The service networks 80_3 to 80_6 are service networks that respectively provide services 1 to 4 and are referred to as connection destinations NW1 to NW4. The IP addresses of the S-GWs 83 to 86 are respectively denoted by SGW1 to SGW4.

Referring next to FIGS. 21 and 22, the setting status of the service management table T1 and the mobile equipment management table T2 according to the operation example 1 will be described. FIG. 21 is a diagram showing the setting status of the service management table according to the operation example 1. FIG. 22 is a diagram showing the setting status of the mobile equipment management table according to the operation example 1.

As shown in FIG. 21, the administrator of the radio communication system 200 registers the service management table T1 in such a way that the base stations 60_3 to 60_6 are respectively associated with the services 1 to 4 and the service networks 80_3 to 80_6 are respectively associated with the services 1 to 4. As shown in FIG. 22, the administrator of the radio communication system 200 registers the mobile equipment management table T2 in such a way that the services 1 to 4 are respectively associated with the mobile equipment 50_3 to 50_6. Accordingly, as shown below, it is possible to provide different services for each base station and each mobile equipment.

The MME 70 provides the service 1 for the mobile equipment 50_3 that is in the communication area 61_3 of the base station 60_3 by causing this mobile equipment 50_3 to be connected to the service network 80_3. Since services different from that in the mobile equipment 50_3 are configured in the base stations 60_4 to 60_6, the MME 70 rejects a handover from the base station 60_3 to the base stations 60_4 to 60_6. Further, since services different from that in the base station 60_3 are configured in the mobile equipment 50_4 to 50_6, the MME 70 rejects call connection of the mobile equipment 50_4 to 50_6 in the communication area 61_3 of the base station 60_3.

The MME 70 provides the service 2 for the mobile equipment 50_4 that is in the communication area 61_4 of the base station 60_4 by causing this mobile equipment 50_4 to be connected to the service network 80_4. Since services different from that in the mobile equipment 50_4 are configured in the base stations 60_3, 60_5, and 60_6, the MME 70 rejects a handover from the base station 60_4 to the base stations 60_3, 60_5, and 60_6. Further, since services different from that in the base station 60_4 are configured in the mobile equipment 50_3, 50_5, and 50_6, the MME 70 rejects call connection of the mobile equipment 50_3, 50_5, and 50_6 in the communication area 61_4 of the base station 60_4.

The MME 70 provides the service 3 for the mobile equipment 50_5 that is in the communication area 61_5 of the base station 60_5 by causing this mobile equipment 50_5 to be connected to the service network 80_5. Since services different from that in the mobile equipment 50_5 are configured in the base stations 60_3, 60_4, and 60_6, the MME 70 rejects a handover from the base station 60_5 to the base stations 60_3, 60_4, and 60_6. Further, since services different from that in the base station 60_5 are configured in the mobile equipment 50_3, 50_4, and 50_6, the MME 70 rejects call connection of the mobile equipment 50_3, 50_4, and 50_6 in the communication area 61_5 of the base station 60_5.

The MME 70 provides the service 4 for the mobile equipment 50_6 that is in the communication area 61_6 of the base station 60_6 by causing this mobile equipment 50_6 to be connected to the service network 80_6. Since services different from that in the mobile equipment 50_6 are configured in the base stations 60_3 to 60_5, the MME 70 rejects a handover from the base station 60_6 to the base stations 60_3 to 60_5. Further, since services different from that in the base station 60_6 are configured in the mobile equipment 50_3 to 50_5, the MME 70 rejects call connection of the mobile equipment 50_3 to 50_5 in the communication area 61_6 of the base station 60_6.

Operation Example 2: Providing Common Service for Each Base Station and Each Mobile Equipment An operation example for providing a common service for each base station and each mobile equipment in a radio communication system in which the PLMN and the APN are commonly used will be described.

Figure 23:
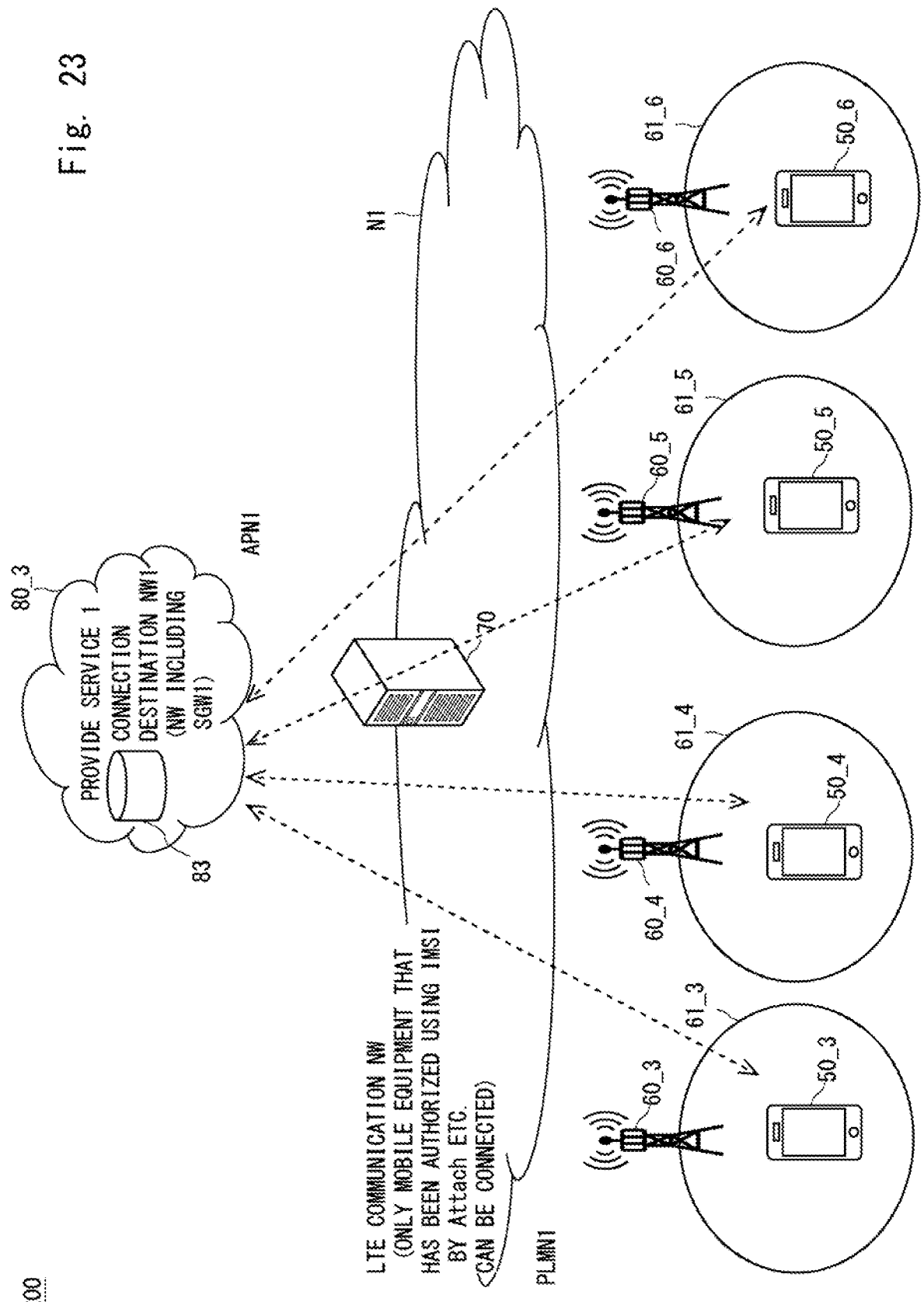
FIG. 23 is a diagram showing one example of a radio communication system according to an operation example 2.

FIG. 23 is a diagram showing one example of a radio communication system according to the operation example 2. A radio communication system 200 includes mobile equipment 50_3 to 50_6, base stations 60_3 to 60_6, an MME 70, and a service network 80_3.

Referring next to FIGS. 24 and 25, the setting status of the service management table T1 and the mobile equipment management table T2 according to the operation example 2 will be described. FIG. 24 is a diagram showing the setting status of the service management table according to the operation example 2. FIG. 25 is a diagram showing the setting status of the mobile equipment management table according to the operation example 2.

As shown in FIG. 24, the administrator of the radio communication system 200 registers the service management table T1 in such a way that the base stations 60_3 to 60_6 are associated with the service 1 and the service network 80_3 is associated with the service 1. As shown in FIG. 25, the administrator of the radio communication system 200 registers the mobile equipment management table T2 in such a way that the service 1 is associated with the mobile equipment 50_3 to 50_6. Accordingly, it is possible to provide a common service for each base station and each mobile equipment as described below.

The MME 70 provides the service 1 for the communication area 61_3 of the base station 60_3, and the mobile equipment 50_3 to 50_6 by causing them to be connected to the service network 80_3. In the operation example 2, the MME 70 permits a handover from the base station 60_3 to the base stations 60_4 to 60_6.

Regarding the communication areas 61_4 to 61_6 of the base stations 60_4 to 60_6 as well, the MME 70 provides the service 1 for the mobile equipment 50_3 to 50_6 by causing them to be connected to the service network 80_3. The MME 70 further permits a handover from the base stations 60_4 to 60_6 to another base station.

Operation Example 3: Providing Services Different from Each Other for Each Mobile Equipment in One Base Station An operation example for providing services different from each other for each mobile equipment in one base station in a radio communication system in which the PLMN and the APN are commonly used will be described.

Figure 26:
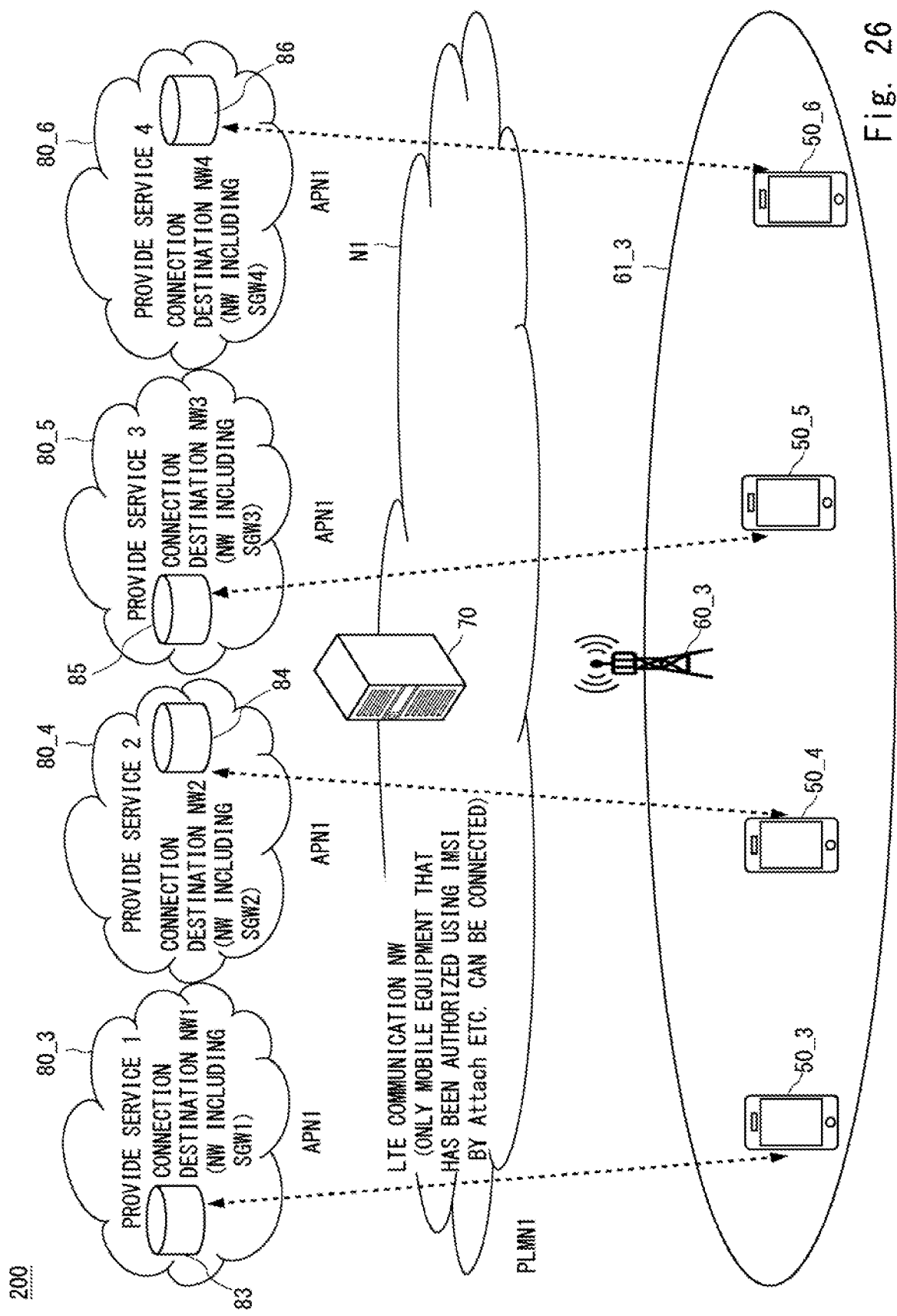
FIG. 26 is a diagram showing one example of a radio communication system according to an operation example 3.

FIG. 26 is a diagram showing one example of a radio communication system according to the operation example 3. A radio communication system 200 includes mobile equipment 50_3 to 50_6, a base station 60_3, an MME 70, and service networks 80_3 to 80_6.

Referring next to FIGS. 27 and 22, the setting status of the service management table T1 and the mobile equipment management table T2 according to the operation example 3 will be described. FIG. 27 is a diagram showing the setting status of the service management table according to the operation example 3.

As shown in FIG. 27, the administrator of the radio communication system 200 registers the service management table T1 in such a way that the base station 60_3 is associated with the services 1 to 4. The administrator further registers the service management table T1 in such a way that the service networks 80_3 to 80_6 are respectively associated with the services 1 to 4. The administrator of the radio communication system 200 registers a configuration similar to that in the operation example 1 shown in FIG. 22 in the mobile equipment management table T2. Accordingly, as shown below, it is possible to provide services different from each other for each mobile equipment in one base station.

The MME 70 provides the service 1 for a communication area 61_3 of the base station 60_3, and the mobile equipment 50_3 by causing them to be connected to the service network 80_3.

The MME 70 provides the service 2 for the communication area 61_3 of the base station 60_3, and the mobile equipment 50_4 by causing them to be connected to the service network 80_4.

The MME 70 provides the service 3 for the communication area 61_3 of the base station 60_3, and the mobile equipment 50_5 by causing them to be connected to the service network 80_5.

The MME 70 provides the service 4 for the communication area 61_3 of the base station 60_3, and the mobile equipment 50_6 by causing them to be connected to the service network 80_6.

Operation Example 4: Providing Services Different from Each Other for Smartphone Terminal and IoT Terminal (Shared by Base Stations)

An operation example for providing services different from each other for, for example, a smartphone terminal and an IoT terminal in a radio communication system in which the PLMN and the APN are commonly used, the smartphone terminal and the IoT terminal sharing one base station in the operation example, will be described. Since the smartphone terminal is one example of a movable mobile equipment, it may be, for example, a tablet terminal or a mobile phone.

Figure 28:
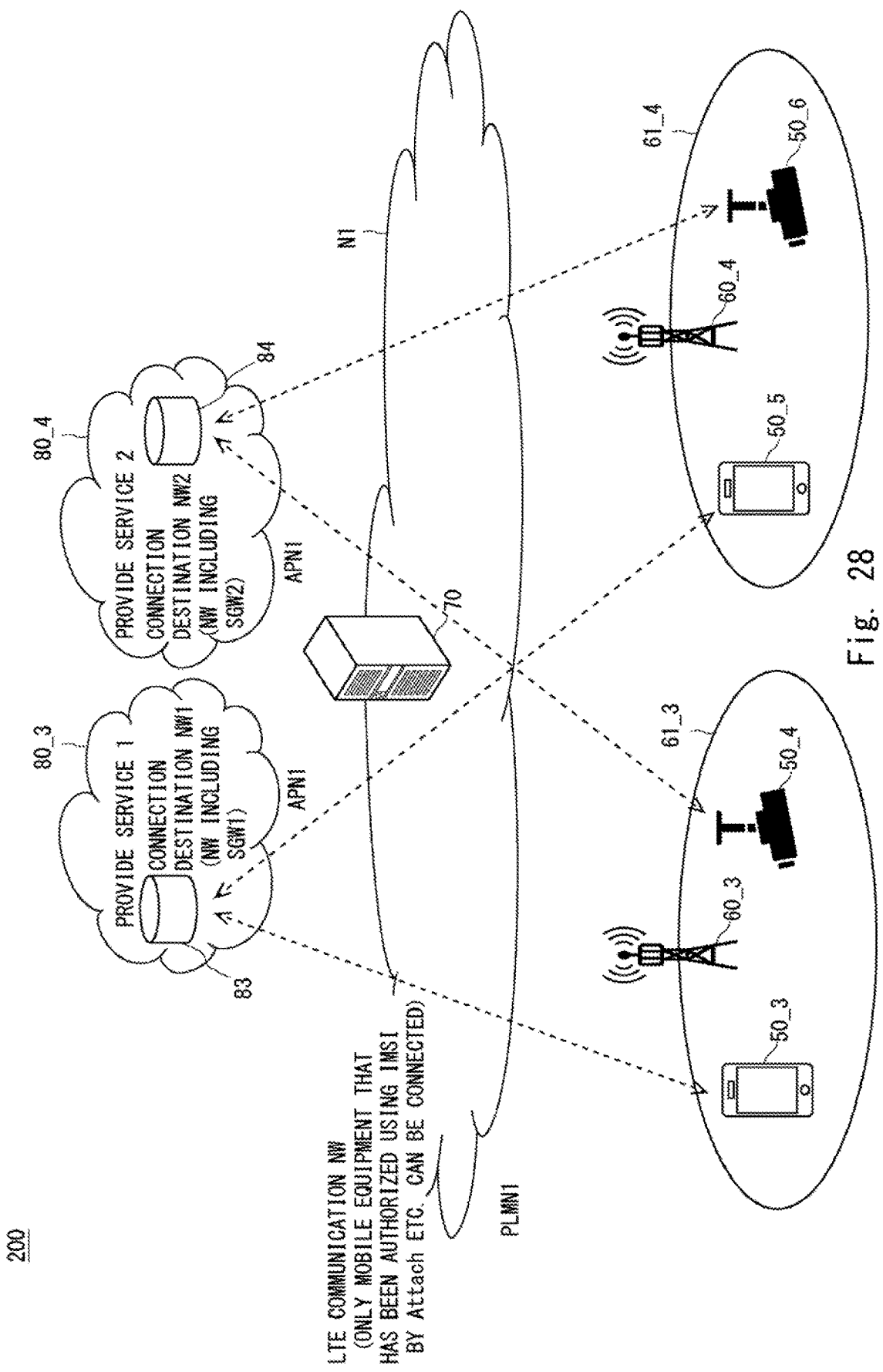
FIG. 28 is a diagram showing one example of a radio communication system according to an operation example 4.

FIG. 28 is a diagram showing one example of a radio communication system according to the operation example 4. A radio communication system 200 includes mobile equipment 50_3 to 50_6, base stations 60_3 and 60_4, an MME 70, and service networks 80_3 and 80_4.

In the operation example 4, the mobile equipment 50_3 and 50_5 are smartphone terminals and the mobile equipment 50_4 and 50_6 are IoT terminals.

Referring next to FIGS. 29 and 30, the setting status of the service management table T1 and the mobile equipment management table T2 according to the operation example 4 will be described. FIG. 29 is a diagram showing the setting status of the service management table according to the operation example 4. FIG. 30 is a diagram showing the setting status of the mobile equipment management table according to the operation example 4.

As shown in FIG. 29, the administrator of the radio communication system 200 registers the service management table T1 in such a way that the base stations 60_3 and 60_4 are associated with both the services 1 and 2 and the service networks 80_3 and 80_4 are associated with the services 1 and 2. As shown in FIG. 30, the administrator of the radio communication system 200 registers the mobile equipment management table T2 in such a way that the mobile equipment 50_3 and 50_5 are associated with the service 1. Further, the administrator of the radio communication system 200 registers the mobile equipment management table T2 in such a way that the mobile equipment 50_4 and 50_6 are associated with the service 2. Accordingly, as shown below, services different from each other can be provided for the smartphone terminals and the IoT terminals.

The MME 70 provides the service 1 for the communication areas 61_3 and 61_4 of the base stations 60_3 and 60_4, and the smartphone terminals (the mobile equipment 50_3 and 50_5) by causing them to be connected to the service network 80_3.

The MME 70 provides the service 2 for the communication areas 61_3 and 61_4 of the base stations 60_3 and 60_4, and the IoT terminals (the mobile equipment 50_4 and 50_6) by causing them to be connected to the service network 80_4.

The MME 70 performs control in such a way that the smartphone terminals (the mobile equipment 50_3 and 50_5) cannot be connected to the service network 80_4. Further, the MME 70 performs control in such a way that the IoT terminals (the mobile equipment 50_4 and 50_6) cannot be connected to the service network 80_3. Therefore, according to the operation example 4, it is possible to separate the service network that handles general data handled by the smartphone terminals from the service network that handles data collected by the IoT terminals. Accordingly, with the operation example 4, it is possible to achieve low latency and enhanced confidentiality for the data communication of the IoT terminals.

Operation Example 5: Providing Services Different from Each Other for Smartphone Terminals and IoT Terminals (Separate by Base Stations)

An operation example for providing services different from each other for, for example, smartphone terminals and IoT terminals in a radio communication system in which the PLMN and the APN are commonly used, in which a base station for smartphone terminals and a base station for IoT terminals are separated from each other will be described. The smartphone terminal, which is one example of a movable mobile equipment, may be, for example, a tablet terminal or may be a mobile phone.

Figure 31:
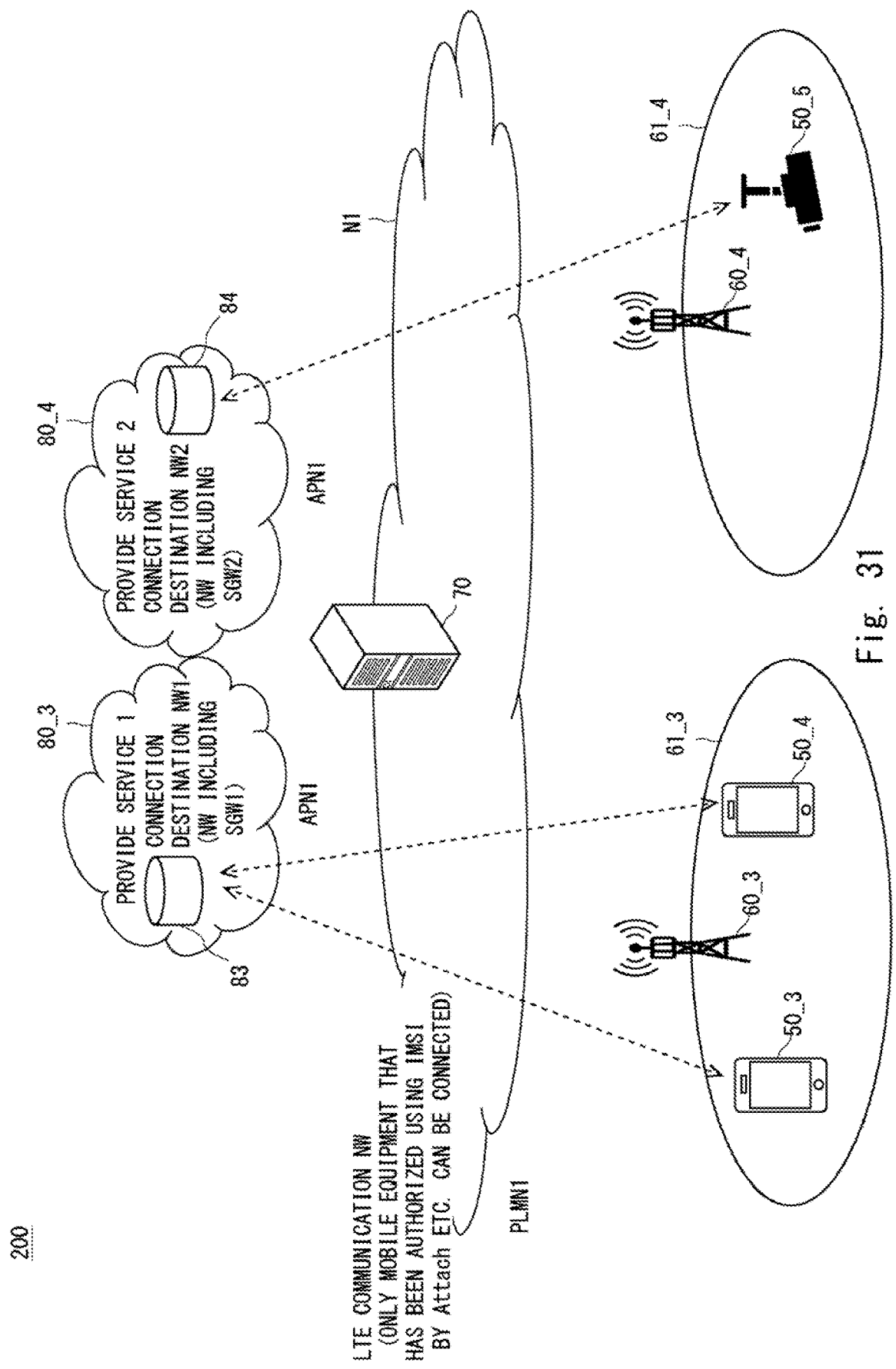
FIG. 31 is a diagram showing one example of a radio communication system according to an operation example 5.

FIG. 31 is a diagram showing one example of a radio communication system according to the operation example 5. A radio communication system 200 includes mobile equipment 50_3 to 50_5, base stations 60_3 and 60_4, an MME 70, and service networks 80_3 and 80_4.

In the operation example 5, the mobile equipment 50_3 and 50_4 are smartphone terminals and the mobile equipment 50_5 is an IoT terminal.

Referring next to FIGS. 32 and 33, the setting status of the service management table T1 and the mobile equipment management table T2 according to the operation example 5 will be described. FIG. 32 is a diagram showing the setting status of the service management table according to the operation example 5. FIG. 33 is a diagram showing the setting status of the mobile equipment management table according to the operation example 5.

As shown in FIG. 32, the administrator of the radio communication system 200 registers the service management table T1 in such a way that the base stations 60_3 and 60_4 are respectively associated with the services 1 and 2 and the service networks 80_3 and 80_4 are respectively associated with the services 1 and 2. As shown in FIG. 33, the administrator of the radio communication system 200 registers the mobile equipment management table T2 in such a way that the mobile equipment 50_3 and 50_4 are associated with the service 1. Further, the administrator of the radio communication system 200 registers the mobile equipment management table T2 in such a way that the mobile equipment 50_5 corresponds to the service 2. Accordingly, as described below, services different from each other can be provided for the smartphone terminals and IoT terminals.

The MME 70 provides the service 1 for the communication area 61_3 of the base station 60_3, and the smartphone terminals (the mobile equipment 50_3 and 50_4) by causing them to be connected to the service network 80_3. The MME 70 rejects a handover performed by the smartphone terminals (the mobile equipment 50_3 and 50_4) from the communication area 61_3 of the base station 60_3 to the communication area 61_4 of the base station 60_4. Further, the MME 70 rejects call connection from the IoT terminal (the mobile equipment 50_5) in the communication area 61_3 of the base station 60_3.

The MME 70 provides the service 2 for the communication area 61_4 of the base station 60_4, and the IoT terminal (the mobile equipment 50_5) by causing them to be connected to the service network 80_4. Note that the MME 70 rejects a handover performed by the IoT terminal (the mobile equipment 50_5) from the communication area 61_4 of the base station 60_4 to the communication area 61_3 of the base station 60_3. Further, the MME 70 rejects call connection from the smartphone terminals (the mobile equipment 50_3 and 50_4) in the communication area 61_4 of the base station 60_4.

The MME 70 performs control in such a way that the smartphone terminals (the mobile equipment 50_3 and 50_4) cannot be connected to the service network 80_4. The MME 70 further performs control in such a way that the IoT terminal (the mobile equipment 50_5) cannot be connected to the service network 80_3. Therefore, according to the operation example 5, it is possible to separate a base station that handles general data handled by smartphone terminals from a base station that handles data collected by IoT terminals. That is, according to the operation example 5, it is possible to deal with different types of data for each communication area of the base station. Accordingly, with the operation example 5, it becomes possible to further achieve low latency and enhanced confidentiality for data communication of IoT terminals than in the operation example 4.

Other Example Embodiments

Figure 34:
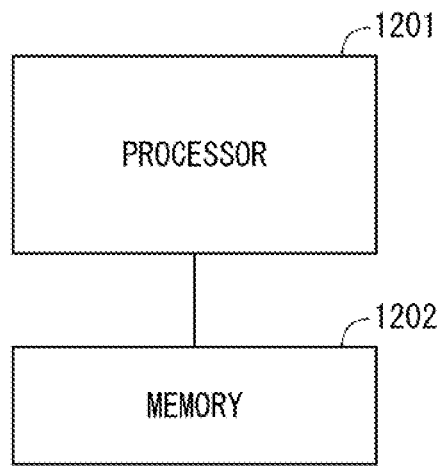

A hardware configuration example of the core network apparatus 30 and the MME 70 (hereinafter they are referred to as the core network apparatus 30 and the like) described in the aforementioned example embodiments may be as follows. FIG. 34 is a diagram showing a hardware configuration example of the core network apparatus and the like. Referring to FIG. 34, the core network apparatus 30 and the like include a processor 1201 and a memory 1202.

The processor 1201 loads software (computer program) from the memory 1202 and executes the loaded software, thereby performing operations of the core network apparatus 30 and the like described with reference to the flowcharts in the aforementioned example embodiments. The processor 1201 may be, for example, a microprocessor, a Micro Processing Unit (MPU), or a Central Processing Unit (CPU). The processor 1201 may include a plurality of processors.

The memory 1202 is composed of a combination of a volatile memory and a non-volatile memory. The memory 1202 may include a storage located apart from the processor 1201. In this case, the processor 1201 may access the memory 1202 via an I/O interface that is not shown.

In the example shown in FIG. 34, the memory 1202 is used to store software modules. The processor 1201 loads these software modules from the memory 1202 and executes these loaded software modules, thereby being able to perform operations of the core network apparatus 30 and the like described in the aforementioned example embodiments.

As described with reference to FIG. 34, each of the processors included in the core network apparatus 30 and the like executes one or more programs including instructions for causing a computer to perform the algorithm described with reference to the drawings.

In the aforementioned examples, the program(s) can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), and optical magnetic storage media (e.g., magneto-optical disks). Further, examples of non-transitory computer readable media include CD-Read Only Memory (CD-ROM), CD-R, and CD-R/W. Further, examples of non-transitory computer readable media include semiconductor memories. The semiconductor memories include, for example, mask ROM, Programmable ROM (PROM), Erasable ROM (EPROM), flash ROM, and Random Access Memory (RAM). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While the present invention has been described above with reference to the example embodiments, the present invention is not limited to the aforementioned example embodiments. Various changes that may be understood by those skilled in the art can be made to the configuration and the details of the present invention within the scope of the present invention. Further, the present disclosure may be executed by combining each of the example embodiments as appropriate.

Further, the whole or part of the example embodiments disclosed above can be described as, but not limited to, the following supplementary notes.

Supplementary Note 1

A core network apparatus comprising:
a reception unit configured to acquire, when a service network that provides a service for a communication terminal and the communication terminal are connected to each other, identification information of the communication terminal and identification information of a base station included in a connection request message transmitted from the base station connected to the communication terminal;
a control unit configured to determine whether a first service associated with the identification information of the communication terminal coincides with a second service associated with the identification information of the base station; and
a transmission unit configured to transmit connection information of a service network that provides the second service to the base station when the first service coincides with the second service.

Supplementary Note 2

The core network apparatus according to Supplementary Note 1, wherein the control unit specifies the first service and the second service based on a first management table and a second management table, the first management table managing the identification information of the communication terminal in association with the service provided for the communication terminal, and the second management table managing the identification information of the base station, a service whose provided area is a communication area of the base station, and connection information of a service network that provides the service in association with one another.

Supplementary Note 3

The core network apparatus according to Supplementary Note 1 or 2, wherein the control unit rejects the connection between the service network and the communication terminal when the first service does not coincide with the second service.

Supplementary Note 4

The core network apparatus according to any one of Supplementary Notes 1 to 3, wherein
  the identification information of the communication terminal comprises System Architecture Evolution (SAE)-Temporary Mobile Subscriber Identity (S-TMSI),
  the connection information comprises first address information indicating address information of a gateway apparatus included in the service network, and
  the transmission unit transmits the first address information when the reception unit has acquired the S-TMSI and the first service coincides with the second service.

Supplementary Note 5

The core network apparatus according to Supplementary Note 4, wherein the transmission unit configures the first address information in a Transport Layer Address IE of at least one of an INITIAL CONTEXT SETUP REQUEST message and an E-RAB SETUP REQUEST message and transmits the first address information.

Supplementary Note 6

The core network apparatus according to Supplementary Note 4 or 5, wherein
  the connection request message is an INITIAL UE MESSAGE message, and
  the reception unit acquires the S-TMSI from an S-TMSI IE of the INITIAL UE MESSAGE message and acquires the identification information of the base station from an E-UTRAN CGI IE of the INITIAL UE MESSAGE message.

Supplementary Note 7

The core network apparatus according to any one of Supplementary Notes 4 to 6, wherein
  the identification information of the communication terminal comprises International Mobile Subscriber Identity (IMSI),
  the connection information comprises second address information indicating address information that is available in the service network, and
  the transmission unit transmits the second address information when the reception unit has not acquired the S-TMSI, has acquired the IMSI, and the first service coincides with the second service.

Supplementary Note 8

The core network apparatus according to Supplementary Note 7, wherein
  the connection request message is an INITIAL UE MESSAGE message, and
  the reception unit acquires the IMSI from the EPS mobile identity IE when the S-TMSI IE of the INITIAL UE MESSAGE is not configured and an EPS mobile identity IE is configured.

Supplementary Note 9

The core network apparatus according to any one of Supplementary Notes 1 to 8, wherein
  the reception unit acquires, when the communication terminal performs a handover from the base station to another base station, identification information of the other base station included in a handover request message transmitted from the base station or the other base station,
  the control unit determines whether the second service coincides with a third service associated with the identification information of the other base station, and
  the transmission unit transmits connection information of a service network that provides the third service to the other base station when the second service coincides with the third service.

Supplementary Note 10

The core network apparatus according to Supplementary Note 9, wherein the control unit rejects the handover when the second service does not coincide with the third service.

Supplementary Note 11

The core network apparatus according to any one of Supplementary Notes 1 to 10, wherein common network identification information is assigned to the service network.

Supplementary Note 12

A communication control method comprising:
  acquiring, when a communication terminal is connected to a service network that provides a service for the communication terminal, identification information of the communication terminal and identification information of a base station included in a connection request message transmitted from the base station connected to the communication terminal;
  determining whether a first service associated with the identification information of the communication terminal coincides with a second service associated with the identification information of the base station; and
  transmitting connection information of a service network that provides the second service to the base station when the first service coincides with the second service.

Supplementary Note 13

A communication control program for causing a computer to perform the following processing of:
  acquiring, when a communication terminal is connected to a service network that provides a service for the communication terminal, identification information of the communication terminal and identification information of a base station included in a connection request message transmitted from the base station connected to the communication terminal;
  determining whether a first service associated with the identification information of the communication terminal coincides with a second service associated with the identification information of the base station; and transmitting connection information of a service network that provides the second service to the base station when the first service coincides with the second service.

Supplementary Note 14

A radio communication system comprising a communication terminal, a base station, and a core network apparatus, wherein the core network apparatus performs the following processing of:

acquiring, when a communication terminal is connected to a service network that provides a service for the communication terminal, identification information of the communication terminal and identification information of a base station included in a connection request message transmitted from the base station connected to the communication terminal;

determining whether a first service associated with the identification information of the communication terminal coincides with a second service associated with the identification information of the base station; and transmitting connection information of a service network that provides the second service to the base station when the first service coincides with the second service.

This application is based upon and claims the benefit of priority from Japanese Patent Application No. 2019-113508, filed on Jun. 19, 2019, the disclosure of which is incorporated herein in its entirety by reference.

REFERENCE SIGNS LIST 1, 100 Radio Communication System
10 Communication Terminal
20, 60_1 to 60_6 Base Station
30 Core Network Apparatus
40, 80_1 to 80_6 Service Network
50_1 to 50_6 Mobile Equipment
61_1, 61_2 Communication Area
70 MME
81, 82, 83, 84, 85, 86 S-GW (SGW)
71 Storage Unit
72 Reception Unit
73 Control Unit
74 Transmission Unit

What is claimed is:

1. A core network apparatus comprising:
at least one memory storing instructions, and
at least one processor configured to execute the instructions to;
acquire, when a service network that provides a service for a communication terminal and the communication terminal are connected to each other, identification information of the communication terminal and identification information of a base station included in a connection request message transmitted from the base station connected to the communication terminal;
detect whether a first service associated with the identification information of the communication terminal coincides with a second service associated with the identification information of the base station; and
transmit connection information of a service network that provides the second service to the base station when the first service coincides with the second service, wherein
the identification information of the communication terminal comprises System Architecture Evolution (SAE)-Temporary Mobile Subscriber Identity (S-TMSI),
the connection information comprises first address information indicating address information of a gateway apparatus included in the service network,
the at least one processor configured to execute the instructions to transmit the first address information when the S-TMSI has been acquired and the first service coincides with the second service, the identification information of the communication terminal comprises International Mobile Subscriber Identity (IMSI),
the connection information comprises second address information indicating address information that is available in the service network,
the at least one processor configured to execute the instructions to transmit the second address information when the at least one processor has not acquired the S-TMSI, has acquired the IMSI, and the first service coincides with the second service,
the connection request message is an INITIAL UE MESSAGE message, and
the at least one processor configured to execute the instructions to acquire the IMSI from a EPS (Evolved Packet System) mobile identity IE (Information Element) when the S-TMSI IE of the INITIAL UE MESSAGE is not configured and the EPS mobile identity IE is configured.

2. The core network apparatus according to claim 1, wherein
the at least one processor configured to execute the instructions to specify the first service and the second service based on a first management table and a second management table, the first management table managing the identification information of the communication terminal in association with the service provided for the communication terminal, and the second management table managing the identification information of the base station, a service whose provided area is a communication area of the base station, and connection information of a service network that provides the service in association with one another.

3. The core network apparatus according to claim 1, wherein
the at least one processor configured to execute the instructions to reject the connection between the service network and the communication terminal when the first service does not coincide with the second service.

4. The core network apparatus according to claim 1, wherein
the at least one processor configured to execute the instructions to configure the first address information in a Transport Layer Address IE of at least one of an INITIAL CONTEXT SETUP REQUEST message and an E-RAB SETUP REQUEST message and transmit the first address information.

5. The core network apparatus according to claim 1, wherein
the connection request message is an INITIAL UE MESSAGE message, and
the at least one processor configured to execute the instructions to acquire the S-TMSI from an S-TMSI IE of the INITIAL UE MESSAGE message and acquire the identification information of the base station from an E-UTRAN CGI IE of the INITIAL UE MESSAGE message.

6. The core network apparatus according to claim 1, wherein
the at least one processor configured to execute the instructions to:
acquire, when the communication terminal performs a handover from the base station to another base station, identification information of the other base station included in a handover request message transmitted from the base station or the other base station,
determine whether the second service coincides with a third service associated with the identification information of the other base station, and
transmit connection information of a service network that provides the third service to the other base station when the second service coincides with the third service.

7. The core network apparatus according to claim 6, wherein
the at least one processor configured to execute the instructions to reject the handover when the second service does not coincide with the third service.

8. The core network apparatus according to claim 1, wherein common network identification information is assigned to the service network.

9. A communication control method comprising:
acquiring, when a communication terminal is connected to a service network that provides a service for the communication terminal, identification information of the communication terminal and identification information of a base station included in a connection request message transmitted from the base station connected to the communication terminal;
determining whether a first service associated with the identification information of the communication terminal coincides with a second service associated with the identification information of the base station; and
transmitting connection information of a service network that provides the second service to the base station when the first service coincides with the second service, wherein
the identification information of the communication terminal comprises System Architecture Evolution (SAE)-Temporary Mobile Subscriber Identity (S-TMSI),
the connection information comprises first address information indicating address information of a gateway apparatus included in the service network,
transmitting the first address information when the S-TMSI has been acquired and the first service coincides with the second service, the identification information of the communication terminal comprises International Mobile Subscriber Identity (IMSI),
the connection information comprises second address information indicating address information that is available in the service network,
transmitting the second address information when the at least one processor has not acquired the S-TMSI, has acquired the IMSI, and the first service coincides with the second service,
the connection request message is an INITIAL UE MESSAGE message, and
acquiring the IMSI from a EPS (Evolved Packet System) mobile identity IE (Information Element) when the S-TMSI IE of the INITIAL UE MESSAGE is not configured and the EPS mobile identity IE is configured.

10. A non-transitory computer readable medium storing a communication control program for causing a computer to perform the following processing of:
acquiring, when a communication terminal is connected to a service network that provides a service for the communication terminal, identification information of the communication terminal and identification information of a base station included in a connection request message transmitted from the base station connected to the communication terminal;
determining whether a first service associated with the identification information of the communication terminal coincides with a second service associated with the identification information of the base station; and
transmitting connection information of a service network that provides the second service to the base station when the first service coincides with the second service, wherein
the identification information of the communication terminal comprises System Architecture Evolution (SAE)-Temporary Mobile Subscriber Identity (S-TMSI),
the connection information comprises first address information indicating address information of a gateway apparatus included in the service network,
transmitting the first address information when the S-TMSI has been acquired and the first service coincides with the second service, the identification information of the communication terminal comprises International Mobile Subscriber Identity (IMSI),
the connection information comprises second address information indicating address information that is available in the service network,
transmitting the second address information when the at least one processor has not acquired the S-TMSI, has acquired the IMSI, and the first service coincides with the second service,
the connection request message is an INITIAL UE MESSAGE message, and
acquiring the IMSI from a EPS (Evolved Packet System) mobile identity IE (Information Element) when the S-TMSI IE of the INITIAL UE MESSAGE is not configured and the EPS mobile identity IE is configured.

* * * * *